(12) United States Patent
Karstadt et al.

(10) Patent No.: US 10,941,699 B2
(45) Date of Patent: Mar. 9, 2021

(54) EXHAUST GAS TURBOCHARGER WITH COMBINED ADJUSTMENT DEVICE FOR BYPASS VALVE AND FLOW CONNECTION

(71) Applicant: BorgWarner Inc., Auburn Hills, MI (US)

(72) Inventors: Sascha Karstadt, Undenheim (DE); Sascha Weiske, Weilerbach (DE); Aleksandar Vuletic, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/533,438

(22) PCT Filed: Dec. 7, 2015

(86) PCT No.: PCT/US2015/064181
§ 371 (c)(1),
(2) Date: Jun. 6, 2017

(87) PCT Pub. No.: WO2016/094265
PCT Pub. Date: Jun. 16, 2016

(65) Prior Publication Data
US 2017/0350312 A1   Dec. 7, 2017

(30) Foreign Application Priority Data

Dec. 12, 2014 (DE) ............ 20 2014 009 873.5

(51) Int. Cl.
*F02B 37/18* (2006.01)
*F02B 37/02* (2006.01)
(Continued)

(52) U.S. Cl.
CPC .......... *F02B 37/183* (2013.01); *F02B 37/025* (2013.01); *F02B 37/22* (2013.01);
(Continued)

(58) Field of Classification Search
CPC ...... F02B 37/183; F02B 37/186; F02B 37/24; F02B 37/025; F02B 37/22
See application file for complete search history.

(56) References Cited

U.S. PATENT DOCUMENTS

| 5,943,864 A | 8/1999 | Sumser et al. |
| 2012/0060494 A1* | 3/2012 | Sato .................... F02B 37/025 60/602 |

FOREIGN PATENT DOCUMENTS

| DE | 19618160 A1 | 11/1997 |
| DE | 19853392 A1 | 5/2000 |

(Continued)

OTHER PUBLICATIONS

Machine generated translation of DE 102006058102 (Year: 2008).*
(Continued)

*Primary Examiner* — Ngoc T Nguyen
(74) *Attorney, Agent, or Firm* — Eric L. Doyle; Stephan A. Pendorf; Patent Central LLC

(57) ABSTRACT

A multi-flow exhaust gas turbocharger (101) comprising a turbine (105), a turbine wheel, a first flow (1) and a second flow (2), a bypass line (6) for bypassing the turbine wheel, a bypass valve unit (107) for adjusting the size of a bypass exhaust gas flow through the bypass line (6), and comprising a flow connection unit (108) for adjusting an extent of the connection of exhaust gas flows into the flows (1, 2), characterized in that the bypass valve unit (107) and the flow connection unit (108) can be actuated in a mechanically coupled way by means of a coupling unit (109).

12 Claims, 26 Drawing Sheets

Figure 1:
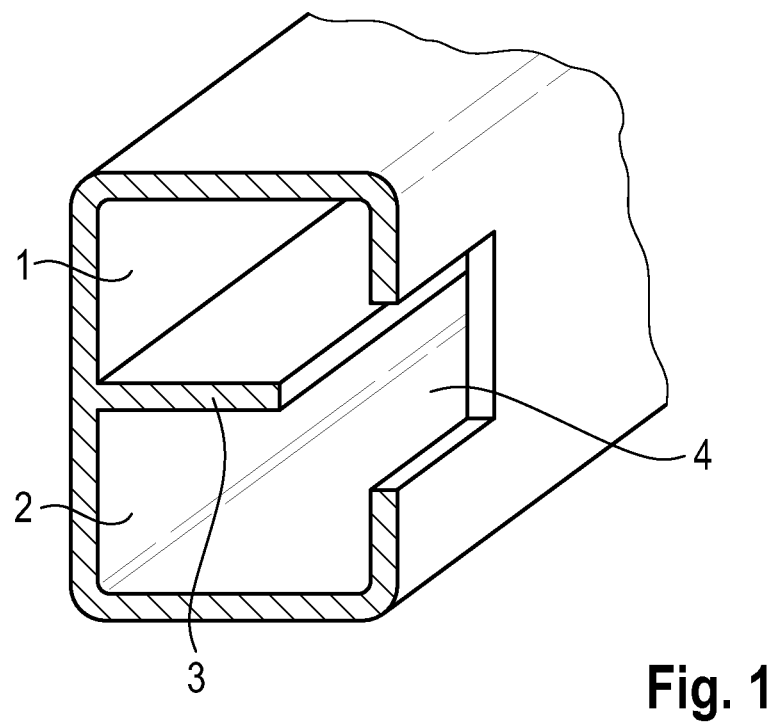

(51) Int. Cl.
*F02B 37/22* (2006.01)
*F02B 37/24* (2006.01)
*F02B 37/12* (2006.01)

(52) U.S. Cl.
CPC ........ *F02B 37/24* (2013.01); *F02B 2037/122* (2013.01); *Y02T 10/144* (2013.01)

(56) References Cited

FOREIGN PATENT DOCUMENTS

| | | |
|---|---|---|
| DE | 102006058102 A1 | 6/2008 |
| DE | 202014100754 U1 | 3/2014 |
| DE | 102013002894 A1 | 9/2014 |
| FR | 2864994 A1 | 7/2005 |
| GB | 2088964 A | 6/1982 |
| JP | 2007154836 A * | 6/2007 |
| WO | WO-2008047943 A1 * | 4/2008 ........... F01D 17/105 |

OTHER PUBLICATIONS

Mahcine generated translation of DE 102006057102.*
International Search Report and Written Opinion in International Application No. PCT/US2015/064181, dated Feb. 17, 2016.
Chinese Office Action (with English language translation) dated Feb. 1, 2019, in Chinese Application No. 201580065972.1.
Second Chinese Office Action (with English language translation) dated Sep. 4, 2019, in Chinese Application No. 201580065972.1.
German Office Action dated Nov. 28, 2019, in German Application No. 112015005540.1.

* cited by examiner

EXHAUST GAS TURBOCHARGER WITH COMBINED ADJUSTMENT DEVICE FOR BYPASS VALVE AND FLOW CONNECTION

The invention relates to a multi-flow exhaust gas turbocharger having a turbine, a turbine wheel, a first flow and a second flow, a bypass line for the turbine wheel, a bypass valve unit for adjusting the size of a bypass gas flow through the bypass channel, and comprising a flow connection unit for adjusting an extent of the connection of exhaust gas flows in the flows. In other aspects, the invention relates to a controller for an exhaust gas turbocharger and two methods for controlling an exhaust gas turbocharger.

Multi-flow exhaust gas turbochargers are known in the prior art, which are used in particular for six-cylinder engines. It is additionally known that pulse charging may occur, in particular at low rotational speeds of the engine supplying the exhaust gas to the turbocharger. Pulse charging uses energy present in the gas pulses in the exhaust to drive the turbine. In a six-cylinder engine, each three cylinders advantageously supplement each other so that preferably exhaust from three cylinders is combined in one flow. It is known that it is favorable for flow conditions to connect the two flows at higher rotational speeds of the engine and correspondingly increased exhaust gas flow. A pressure equalization between the two flows then occurs, which reduces the pulses in the exhaust gas. The turbocharger then transitions into congestion charging operation, in which the turbine primarily converts a congestion pressure of the exhaust gas into a rotational movement. It is further known to divert exhaust gas to the turbine through a bypass line around the turbine to prevent an overload of the turbine in an operating state with a strong exhaust gas flow, wherein the strength of the bypass flow is adjustable by a bypass valve.

For example, it is known from DE 10 2007 0254 37A1 to provide a switching mechanism by means of which exhaust gas may pass from one flow into the other. Further, a bypass valve independent of the flow connection is provided in this patent application, by means of which exhaust gas may be diverted from both flows.

The object of the invention is to make the exhaust gas turbocharger easier to control.

The problem is solved by the features of the independent claims. The dependent claims have advantageous embodiments of the invention as subject matter.

The object of the invention is an exhaust gas turbocharger in which the bypass valve unit and the flow connection unit may be actuated in a mechanically coupled way by means of a coupling unit. The exhaust gas guided through the bypass line is preferably diverted from both flows.

The bypass valve unit is preferably arranged in close spatial proximity to the flow connection unit. The flows are preferably configured as at least approximately the same size. The flow connection unit may be arranged in the feed to the spiral inlet of the turbine. Alternatively or additionally, the distance of the flow connection to the turbine may be large enough to compensate for pressure pulsations between the flows before the exhaust gas reaches the turbine. The flows are preferably connected at higher rotational speeds and/or higher loads.

The mechanical coupling of the flow connection unit to the bypass valve unit results in that the two units are jointly adjustable, which in turn enables a substantially simplified structure for adjusting the operating state. In particular, only a single adjustment device is required. By this means, materials, weight, and ultimately also costs can be saved.

The coupling unit is preferably designed as an adjustment device. This adjustment device unites the bypass valve unit and the flow connection unit. Thus, the exhaust gas flow in the bypass line and the exhaust gas flow between the two flows is adjusted merely by actuating the adjustment device.

The flow resistance, introduced into the bypass exhaust gas flow by the bypass valve unit, may preferably be changed by means of the adjustment device. In particular, a bypass throughflow cross section, which functions at the transfer point from one or multiple of the flows to the bypass line, may be adjusted for this purpose. The flow resistance may likewise by changed at the transition, provided by the flow connection unit, from one flow into another by means of the adjustment device. A connection cross section may be adjusted, for example, in the size thereof, which functions at the transition of the flows into each other. Thus, the extent of the separation or connection of the flows may be adjusted.

The bypass throughflow cross section or the connection cross section may, however does not have to be, the cross section of the one opening in a flow or between two flows, but instead the effective cross section may also extend in an angle to an opening in the flow or in another element and interact with an additional element and the edge of the opening. An example is a covering of an opening in the flow with a type of cover, by lifting the same the effective cross section arises between the cover and the edge of the opening in the flow. The adjustment device for the flow resistance may, in addition, be pressed against by a differential pressure between the flows and/or between a flow and the bypass channel in many operating states so that a good sealing effect arises.

The adjustment device is preferably designed as a one-piece adjustment element. This means that the adjustment device consists only of parts or sections fixedly connected to each other. The adjustment element has no joints or guides between sections, which have the functions of a bypass valve unit and a flow connection unit. If an adjustment element of this type moves, a simultaneously change of the flow resistance of the bypass valve unit and the flow connection unit may take place. This does not have to occur in every adjustment range of the adjustment element.

A common bypass through opening, which runs into a part in both flows respectively, is additionally preferably arranged in the two flows. The adjustment device may close the two parts of the bypass through opening at the same time. By means of a relative movement between the flows and the adjustment device, the flow resistance of the bypass valve unit may be adjusted. The relative movement is preferably a translational relative movement. Alternatively or additionally, a rotational relative movement may be applied, wherein, in particular, an axis of rotation extends through the adjustment device which may be pivoted around this.

Preferably, the adjustment device is designed as an adjustment element in the form of an adjustment slider, which is moveable in a straight line away from the flows and which, if it lies externally on the flows, closes all parts of the bypass through opening in the flows by means of a closing surface. The guide for the relative movement may be affected by a guide unit, in particular a linear guide. In an alternative variant with a rotational relative movement of the adjustment device, the axis of rotation is arranged such that a flat closing section of the adjustment device may be externally applied on the flows to close the bypass through opening.

In another embodiment, the adjustment device comprises an adjustment drum. The adjustment drum is preferably designed substantially cylindrically and is hollow in the interior. The adjustment drum preferably has a flow connection opening for each flow, via which the flows are connectable.

Alternatively or additionally, the adjustment drum may have a bypass recess, in particular a bypass through opening, through which the exhaust gas may arrive in the bypass line.

Exhaust gas flows through the interior of the drum and may exit from here preferably through an exhaust gas through opening into a flow in the direction of the turbine and/or through a bypass recess in the direction of the bypass line.

The bypass recess, in particular bypass through opening, preferably forms an exhaust gas through opening with an edge of the flow or with another edge; the opening is adjustable in particular in an exhaust gas throughflow cross section. Preferably, the adjustment of the exhaust gas throughflow cross section is carried out by rotating and/or displacing the adjustment drum relative to the flows.

The adjustment drum preferably extends within both flows. It preferably runs traversing through the flows, wherein in particular it fills the entire cross section of the flows. A traversing of this type may by carried out at a right angle to the exhaust gas flow, however, it does not have to be.

A central axis of the adjustment drum and a central axis of the turbine are preferably arranged at least approximately parallel to each other.

The exhaust gas through recess in the adjustment drum may have a geometry which affects a predefined change of the exhaust gas throughflow cross section at an adjustment using an edge of one or multiple flows. For example, initially a minor increase of the exhaust gas throughflow cross section may occur per increment of the displacement of the adjustment drum, while in another adjustment range, a substantially greater increase of the exhaust gas throughflow cross section may be carried per increment of displacement of the adjustment drum. It is conceivable to use the interior of the adjustment drum as a mixing chamber for exhaust gas from two different flows, so that when exhaust gas passes through the interior of the adjustment drum, a pressure equalization between different pressures in the two flows may be carried out.

The adjustment drum preferably has an end edge which protrudes at different extents in the axial direction of the drum. An adjustment drum of this type is preferably arranged in the area of the end edge at an angle to a flow. The end with the end edge preferably protrudes into the interior of the flow. The sections of the edge protruding to different extents protrude into the flow to different extents. Upon a rotation of the drum, the sections of the edge protruding to different extents are brought into a different angle with the exhaust gas flow, by which means this is throttled at different levels.

The exhaust gas flow preferably flows out of the flow into the interior of the adjustment drum. The end edge extends preferably in an oblique plane to the longitudinal axis of the adjustment drum. By this means, there results an increase of the projection of the end edge, up to a maximum, in the axial direction of the adjustment drum. A geometry of this type is well suited for an adjustment of the flow resistance in an installed situation, in which the end edge protrudes into the interior of a flow, due to rotation of the adjustment drum.

In another embodiment, the adjustment drum is arranged at a point in the exhaust gas turbocharger at which the flows transition to the turbine wheel. The adjustment drum preferably has one nozzle for each flow respectively. By rotating the adjustment drum, an effective exhaust gas throughflow cross section may be adjusted for the passing through of the exhaust gas through the nozzles.

The adjustment of the cross section is carried out preferably using an edge of the turbocharger and a recess in the adjustment drum which jointly define a nozzle opening. The nozzles may be preferably completely closed so that they function as engine brakes.

The nozzle area may designed to have blades or be vaneless. The cross sectional characteristic of the nozzles, which results due to the rotation of the adjustment drum, may be defined differently for different types of exhaust gas turbochargers. The A/R ratio of the turbocharger as a ratio of the inlet cross sectional area to the radius of the turbine wheel may be changed by means of the cross sectional characteristic via the adjustment area of the adjustment drum. The A/R ratio is thus connected to the output range of an exhaust gas supplying engine of the turbocharger working under favorable conditions.

Furthermore, the flow connection unit has a preferred distance from the turbine, which is sufficient that the pressure compensation between the connected flows leads to a substantial compensation of the exhaust gas flow until this reaches the turbine. The distance of the flow connection unit from the turbine is preferably at least five times an average inner diameter of a flow, particularly preferably at least ten times an average inner diameter of a flow.

It is proposed in another embodiment that the adjustment drum has a separating wall which divides the interior of the adjustment drum into two subchambers. One of these may be used for flow connection and/or for adjusting the functional sizes of nozzle openings, while the other may be used for controlling the sizes of an exhaust gas flow through the bypass line. In particular, both subchambers of the adjustment drum are provided with respectively associated recesses which may be used for controlling the sizes of exhaust gas flows. The separating wall has, in particular, a shape which enables an exhaust gas flow to be diverted using a diversion geometry adjusted in a fluidically optimized way.

A shaft, to which the adjustment drum may be mounted, is preferably fixed on the adjustment drum. The shaft is particularly preferably fixed to an intermediate wall in the interior of the adjustment drum. The shaft may also be integrally designed with the intermediate wall.

The exhaust gas turbocharger preferably has a turbine with variable geometry, namely in particular adjustable blades which are adjustable by means of a blade adjustment device. It is proposed to couple, in particularly mechanically, an actuation of the blade adjustment device with an actuation of the bypass valve unit and the flow connection unit. If the adjustment device is executed as an adjustment drum, this may be integrated in the blade adjustment device, in particular in its adjustment ring. A turbocharger of this type is suited as a turbocharger for gasoline engines with variable turbine geometry as well as for a turbocharger for diesel engines with variable turbine geometry and which have flow separation.

In another embodiment, the adjustment device has a separation section (in the adjustment drum designated as drum separation section), which is designed to cause a complete or strong separation of the flows in at least one operating state, while it is further designed to effect a less strong separation or an increased connection of the flows in another operating state. The separation section may also be formed on a separation element.

The separation section is relatively moveable with respect to the flows, by which means a flow resistance between the flows may be changed. The separation section or the adjustment device on which the separation section is located, may therefore be guided in a guide unit and/or be rotatable around an axis of rotation.

In particular, the guide unit is arranged and/or fixed on the separation section or on the adjustment device.

The separation section preferably has a slot, by means of which, in conjunction with an edge in at least one of the two flows, a change of the flow resistance between the flows may be effected, in that the size of the slot may be changed during adjustment. The separation section is preferably designed as flat.

In particular, the separation section is arranged externally on the adjustment drum for regulating the flow connection. A rotation of the adjustment drum causes, in this case, the relative movement between the separation section and the flow.

The separation section formed as a separating element preferably runs in the circumferential direction along the curvature of the outer surface of the adjustment drum and in the radial direction of the adjustment drum. The separation section is preferably arranged in an area between the flows in at least in one operating state.

In another embodiment, the two flows are respectively provided with an exhaust gas inlet opening and an exhaust gas outlet opening. The exhaust gas outlet opening of one flow is connected or is connectable to an exhaust gas inlet opening of another flow.

The extent of the connection of the exhaust gas inlet opening and outlet opening is adjustable. This may be effected by adjusting an effective size of the exhaust gas outlet opening and/or the exhaust gas inlet opening.

For this purpose, the exhaust gas inlet opening and exhaust gas outlet opening are preferably completely covered, partially covered, or not covered by means of a cover disk.

The cover disk has slots for this purpose which may overlap, partially overlap, or not overlap with the exhaust gas inlet openings and outlet openings, wherein, in the latter case, material of the cover disk is arranged in front of the exhaust gas inlet openings and exhaust gas outlet openings in order to close them.

An overcurrent chamber (also: flow connection chamber) is preferably provided into which the exhaust gas inlet openings and the exhaust gas outlet openings lead. In this chamber, a pressure compensation between the flows may occur, wherein exhaust gas guided from the exhaust gas outlet openings of the flows into the overcurrent chamber may flow through the exhaust gas inlet openings back into the flows and to the turbine.

The bypass valve unit and the flow connection unit are preferably both closed in a closed position. During transition from the closed position into a position, in which the flow resistance of the bypass valve unit and the flow connection unit are respectively reduced, the flow resistance of the bypass valve unit is reduced preferably earlier and/or more strongly upon leaving the closed position than the flow resistance of the flow connection unit. By this means, exhaust gas is preferably guided through the bypass line before a substantial flow connection occurs.

As already described, the bypass gas flow is guided past the turbine wheel by the bypass line upstream of the bypass valve unit. The end of the bypass line is preferably correspondingly positioned in order to optimize the inflow into the catalytic converter. The flow into the catalytic converter, in particular with respect to flow direction and inflow point of the surface, may be definitively configured by a corresponding positioning of the end of the bypass line. By this means, the heating up phase of the catalytic converter may be shortened. This is in particular possible due to the fact that, based on the configuration according to the invention, the bypass valve unit is positioned at the beginning of the bypass line and thus the end of the bypass line may be configured relatively freely.

In another aspect of the invention, a controller for the exhaust gas turbocharger is proposed which has the features of at least one of the previously described embodiments. By means of the controller, the coupling unit, preferably designed as an adjustment device, is actuatable in particular at increasing engine speeds and/or increasing engine loads. Due to the coupled displacement of the bypass valve unit and the flow connection unit, the behavior of the turbocharger is optimized, and a single control signal and/or a single control movement is sufficient for this.

In another aspect of the invention, a method is proposed for controlling an exhaust gas turbocharger which has the features of one of the previously described embodiments. In the method, the coupling unit, preferably designed as an adjustment device, is increasingly actuated if the engine speed and/or the engine load increases. The increase is thereby understood as an actuation from a closed position.

In an embodiment of the method, the bypass valve unit is actuated earlier and/or strongly, starting from the closed position, than the flow connection unit. By this means, the flow resistance of the bypass valve unit is reduced earlier and/or more strongly than the flow resistance of the flow connection unit. The earlier and/or stronger reduction is achieved by the mechanics of the coupling unit, preferably designed as an adjustment device. The control may be carried out by means of a single control signal and/or a single control movement.

Figure 2:
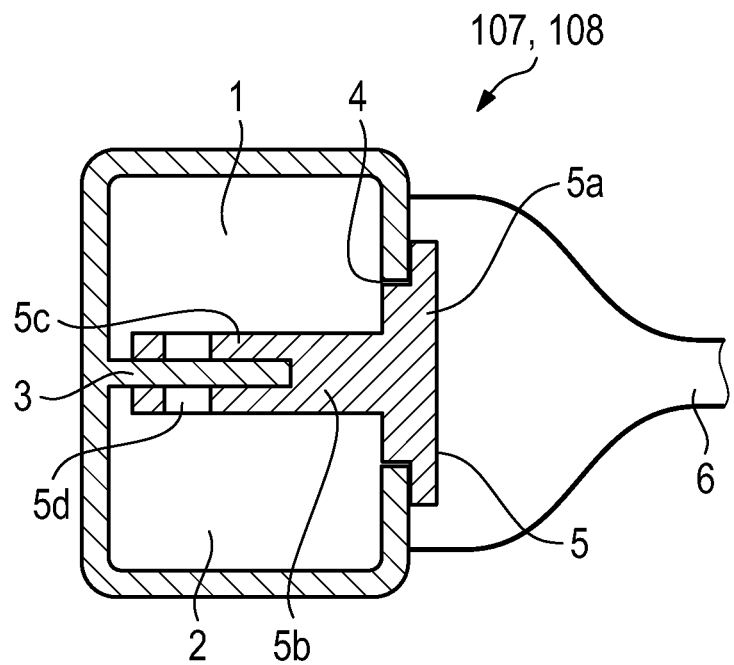
Figure 3:
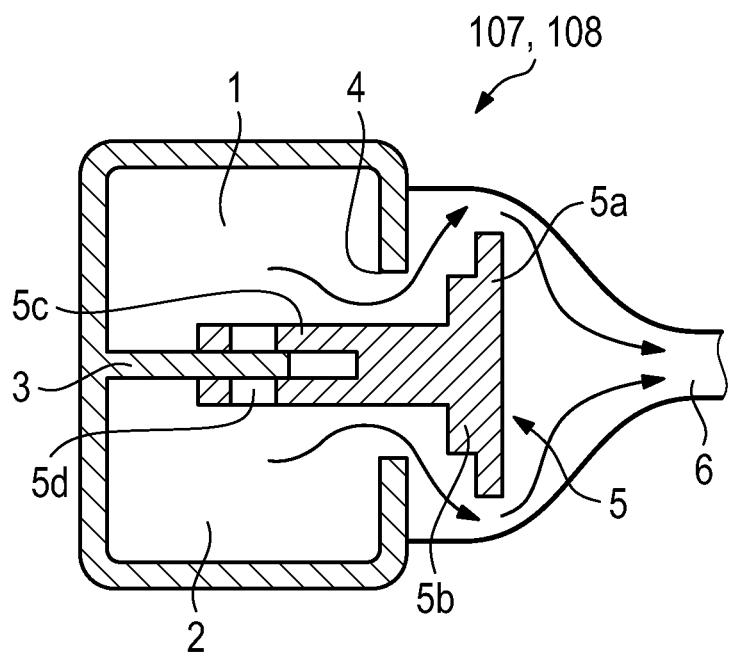
Figure 4:
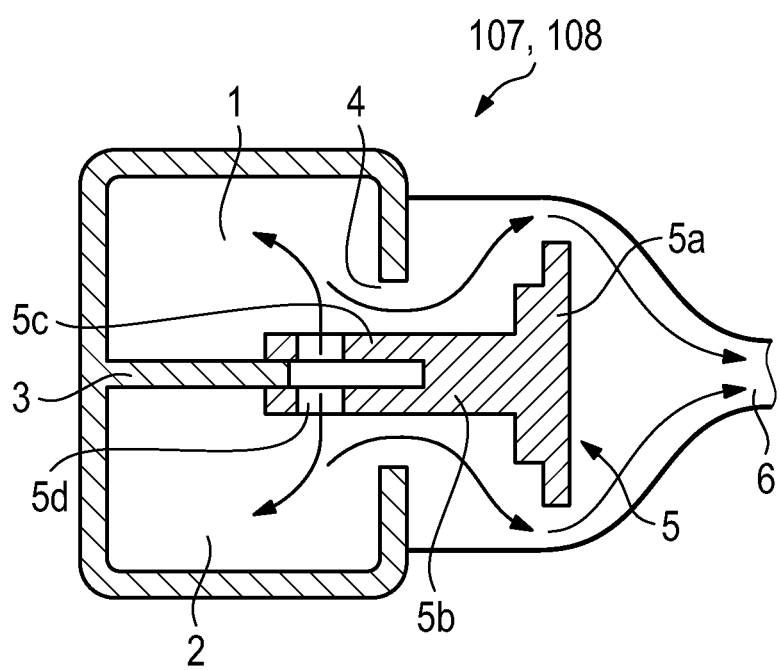
Figure 5:
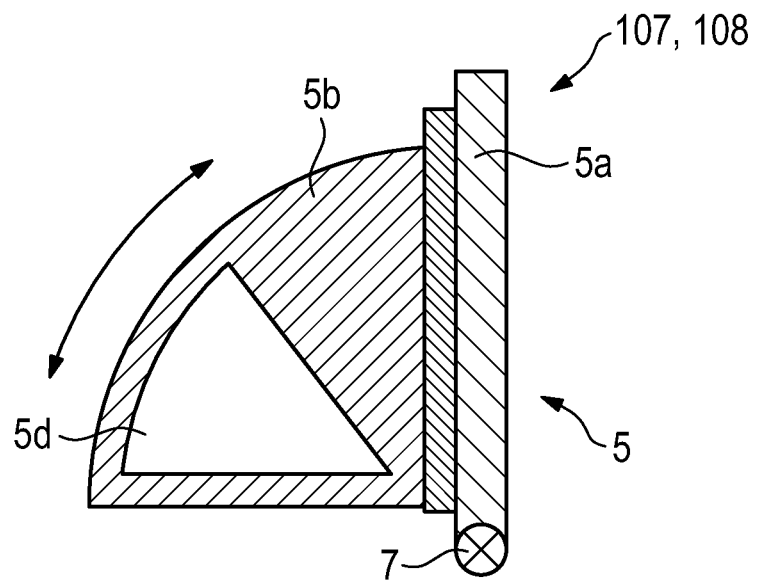
Figure 5A:
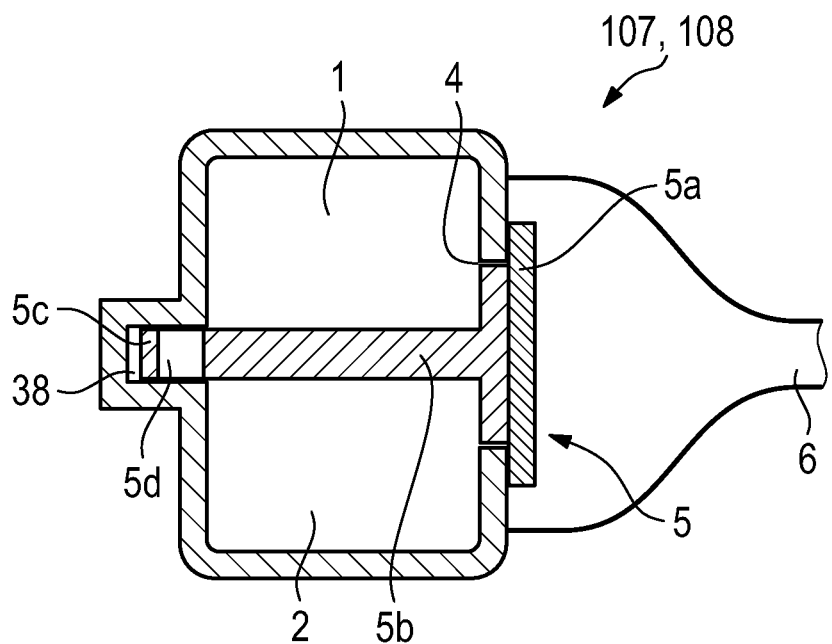
Figure 5B:
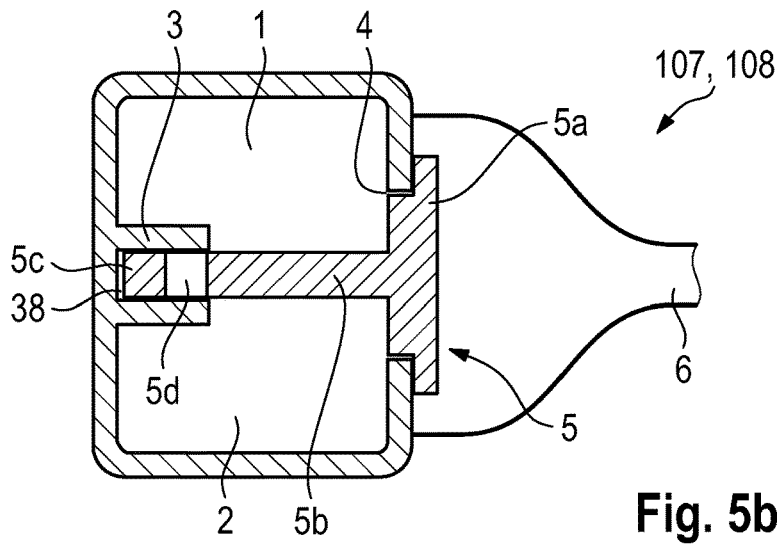
Figure 5C:
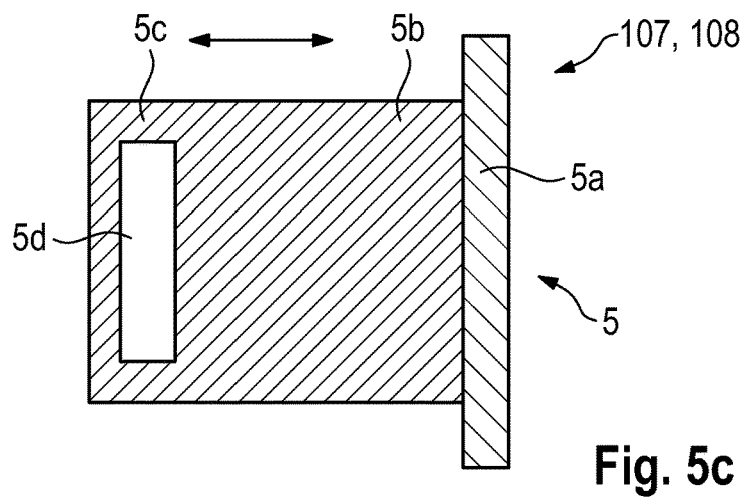
Figure 5D:
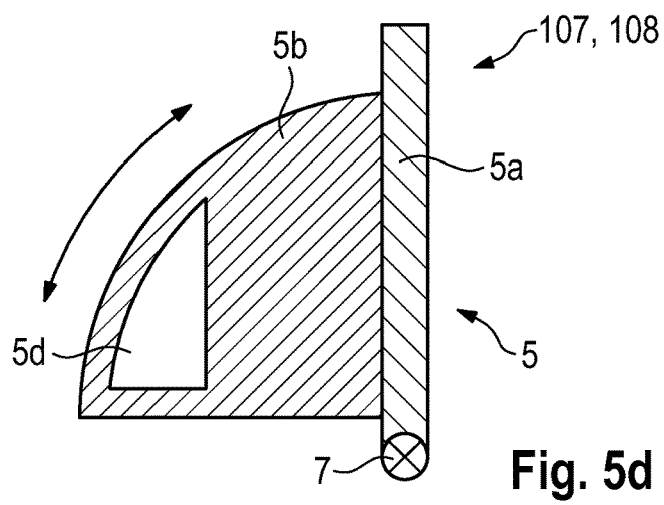
Figure 5E:
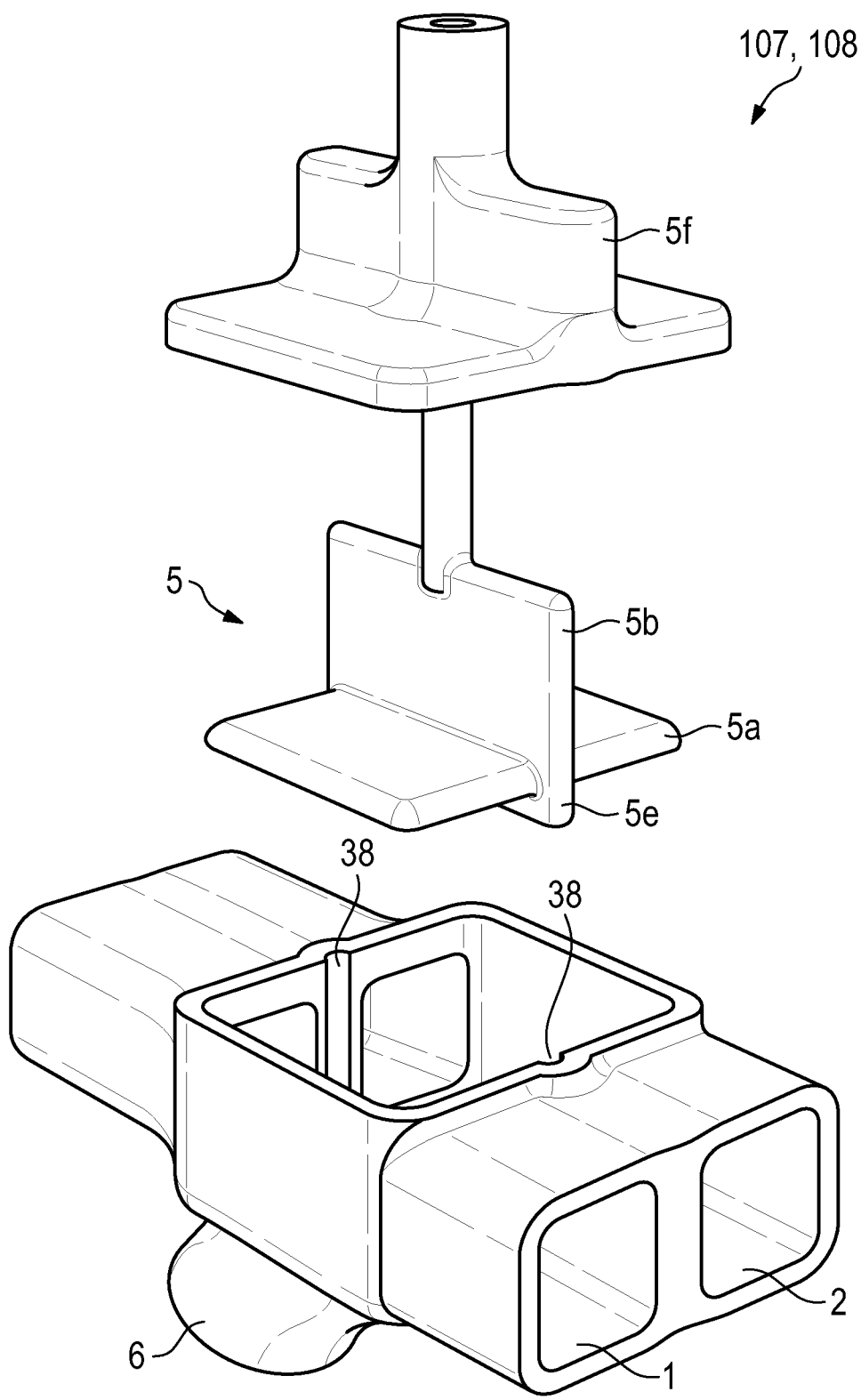
Figure 5F:
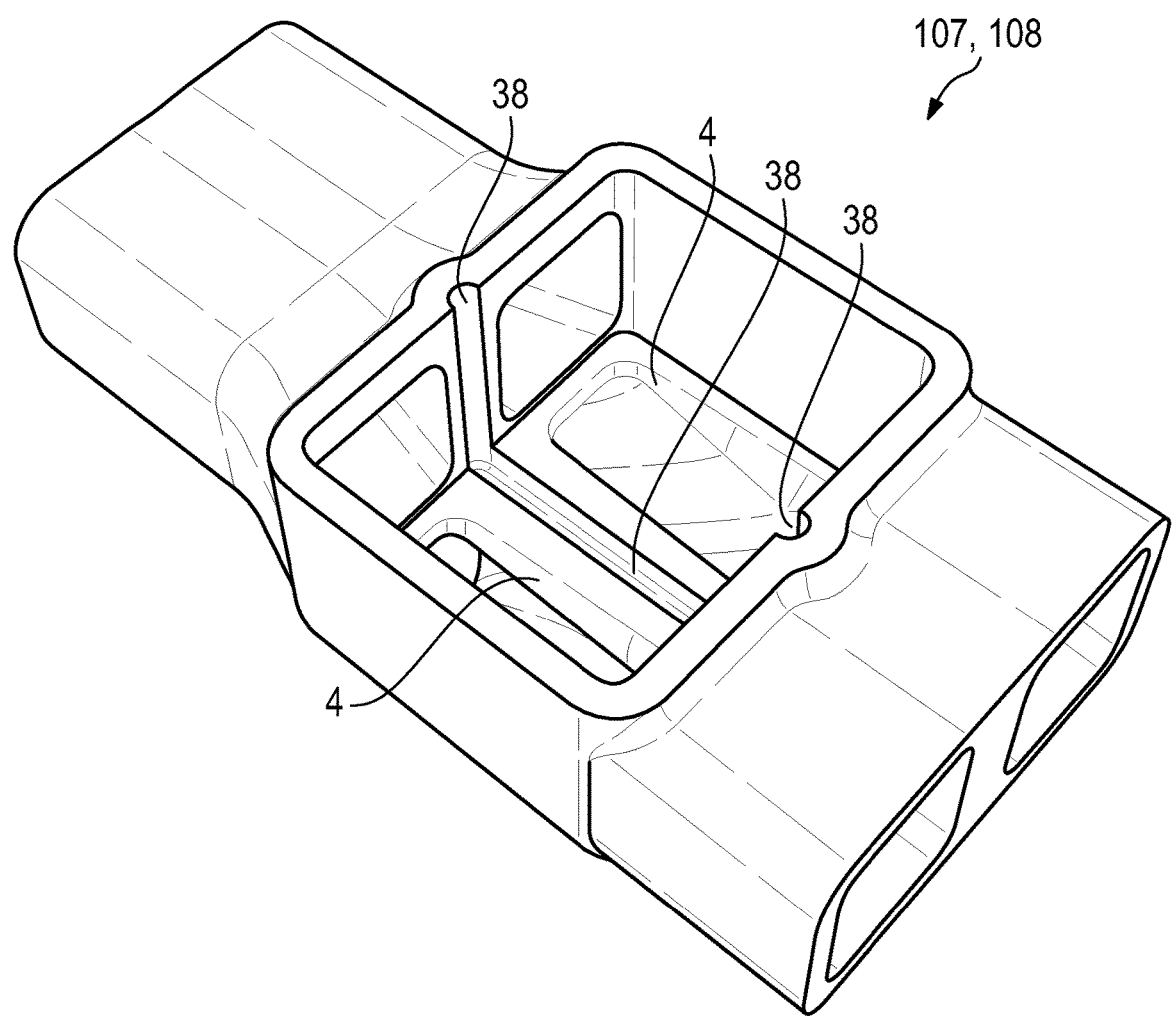
Figure 5G:
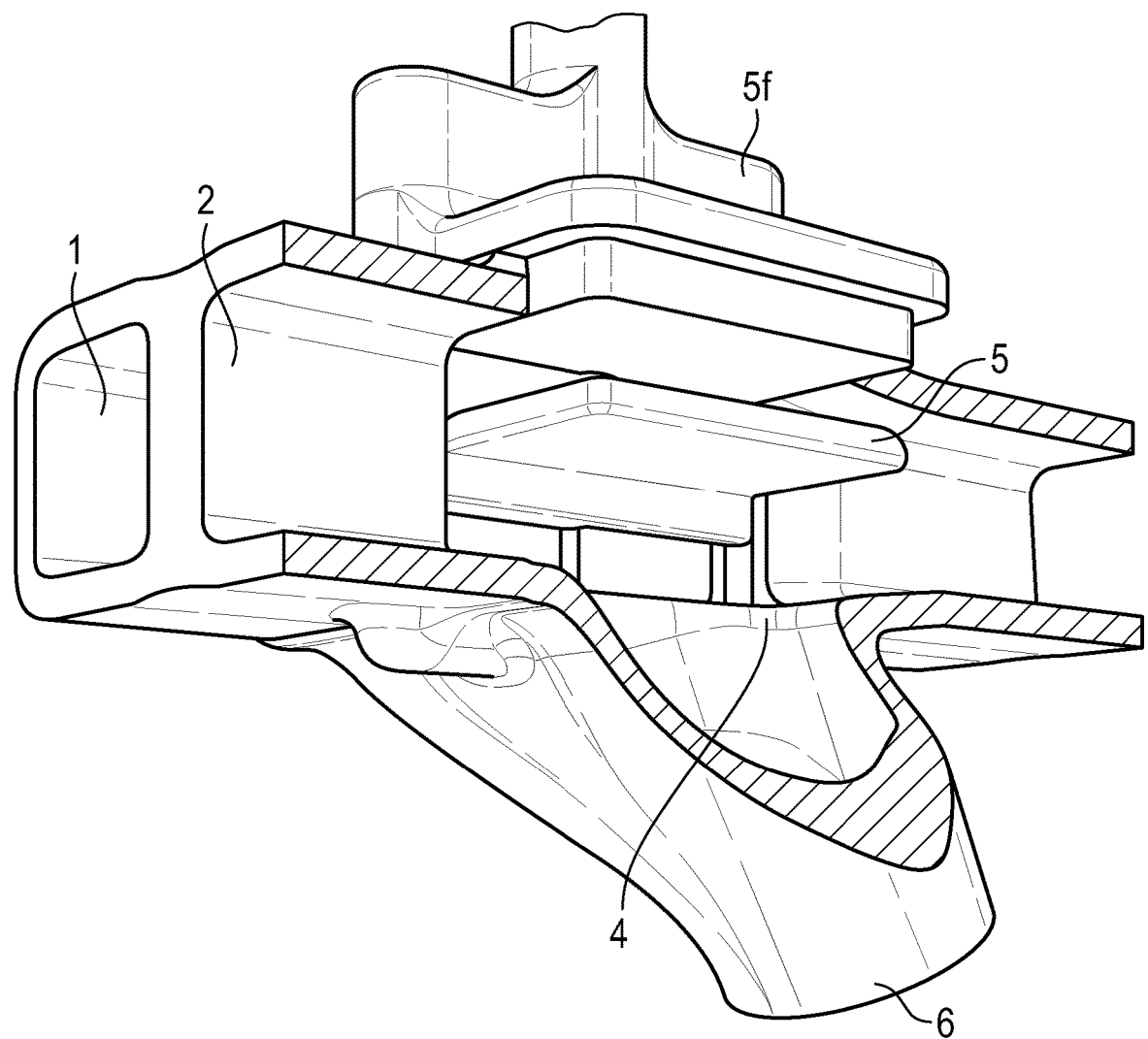
Figure 5H:
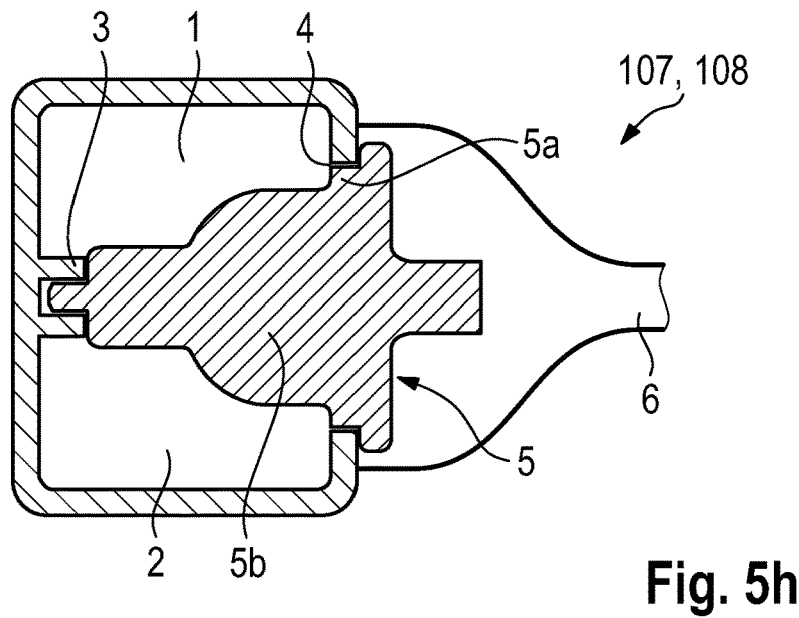
Figure 5I:
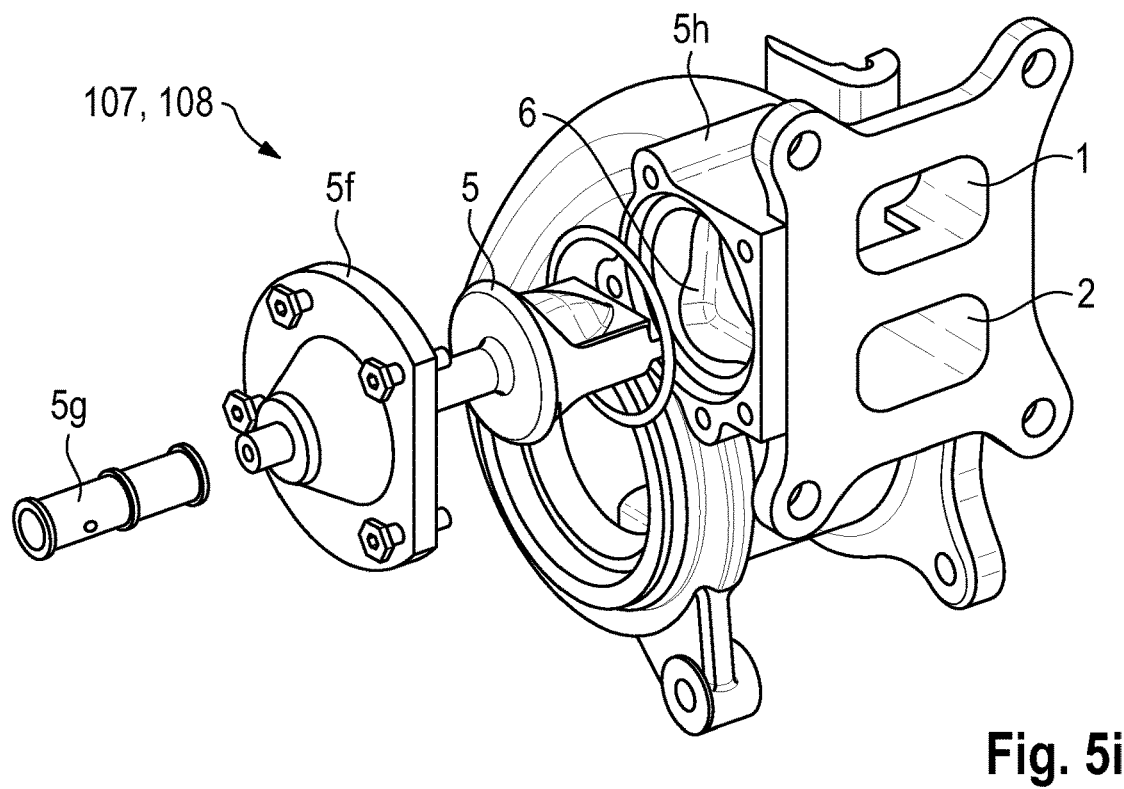
Figure 5J:
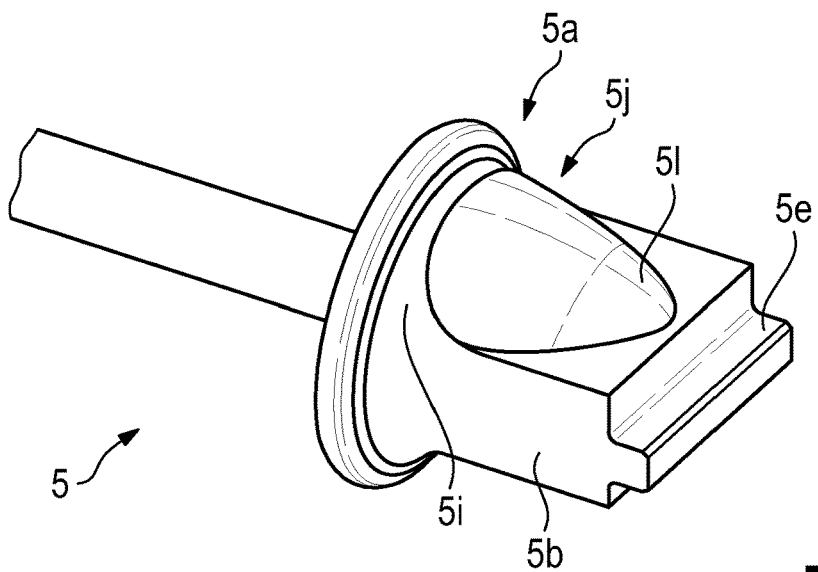
Figure 5K:
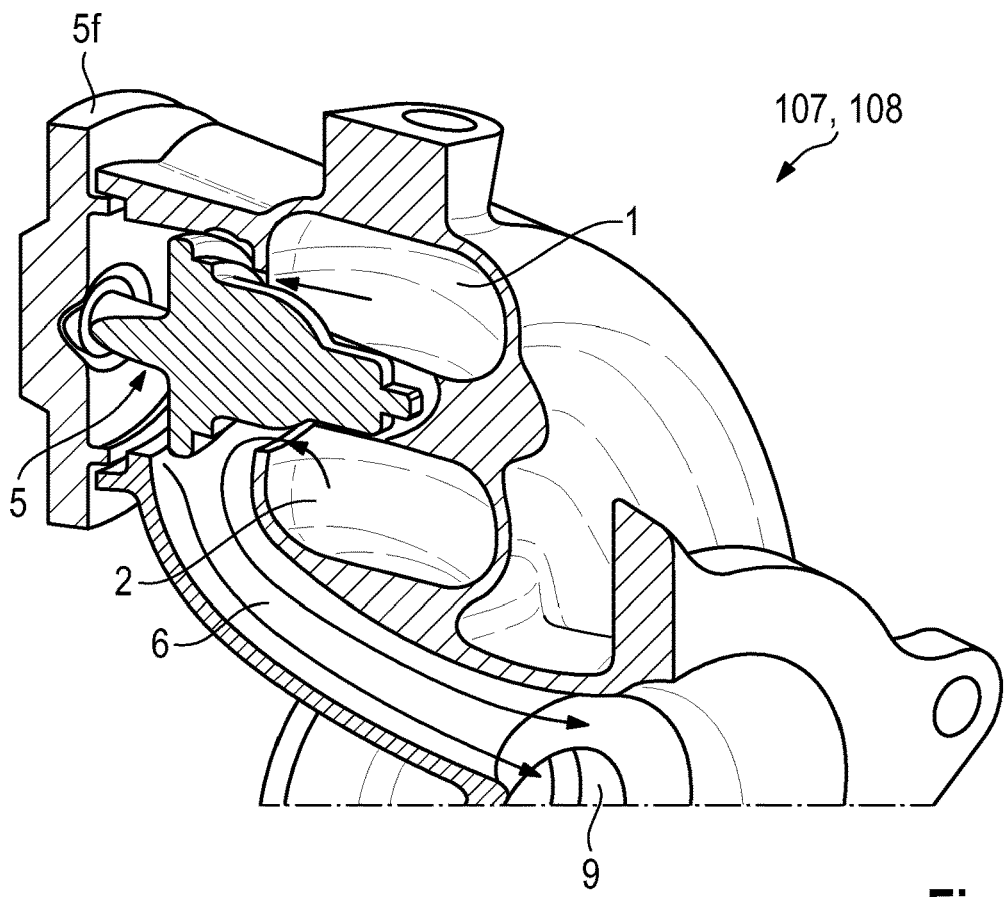
Figure 6:
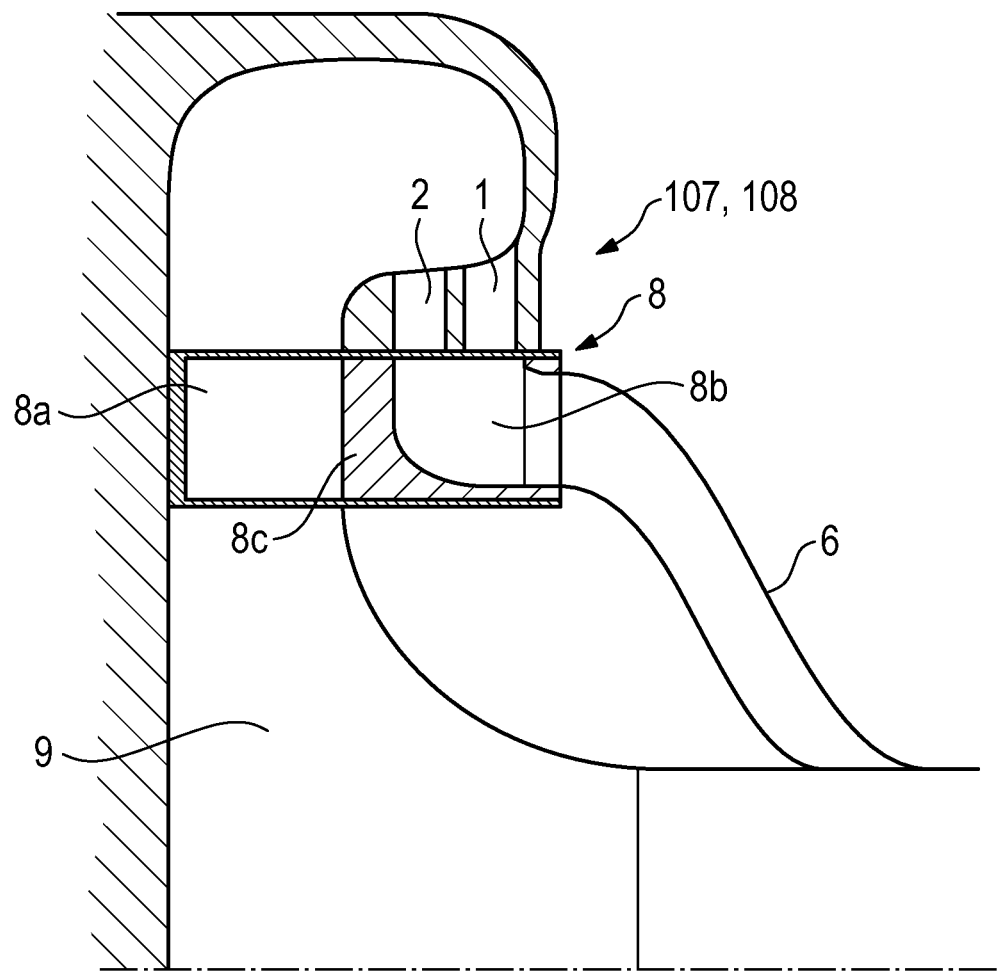
Figure 7:
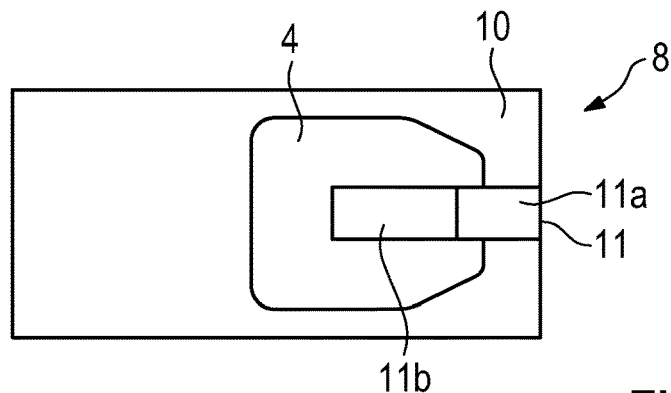
Figure 8:
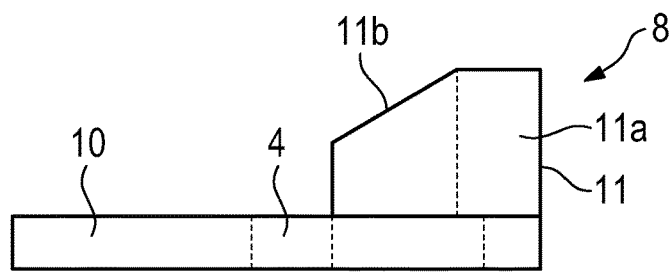
Figure 9:
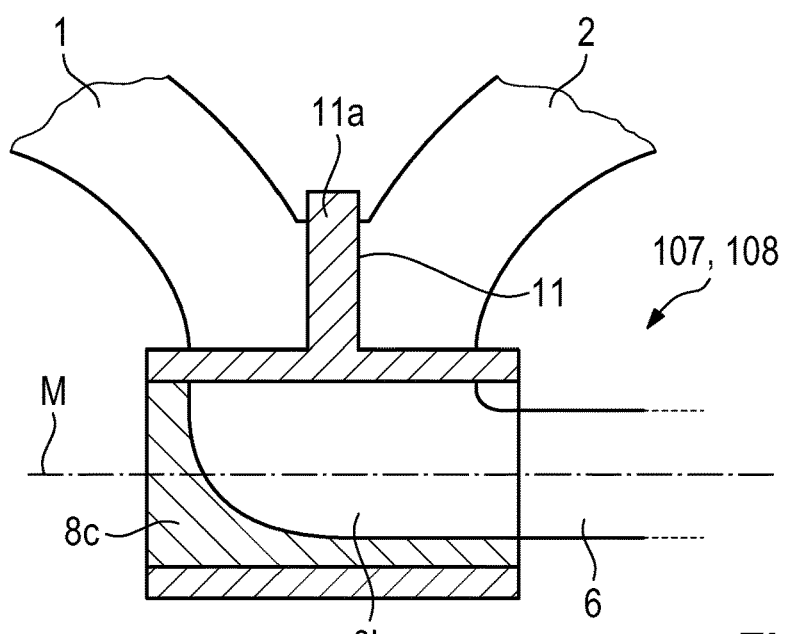
Figure 10:
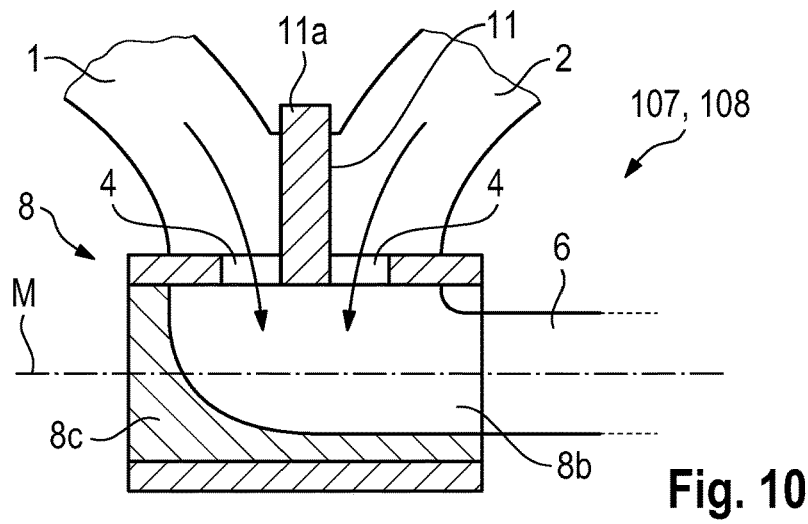
Figure 11:
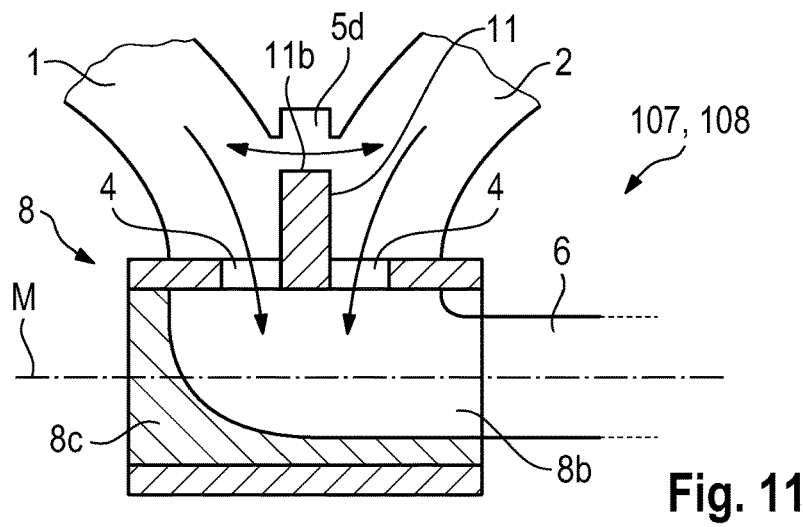
Figure 12:
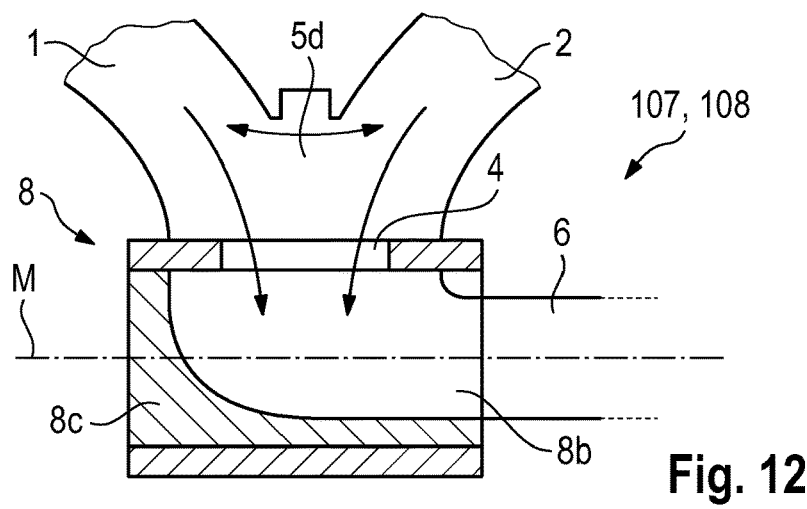
Figure 13:
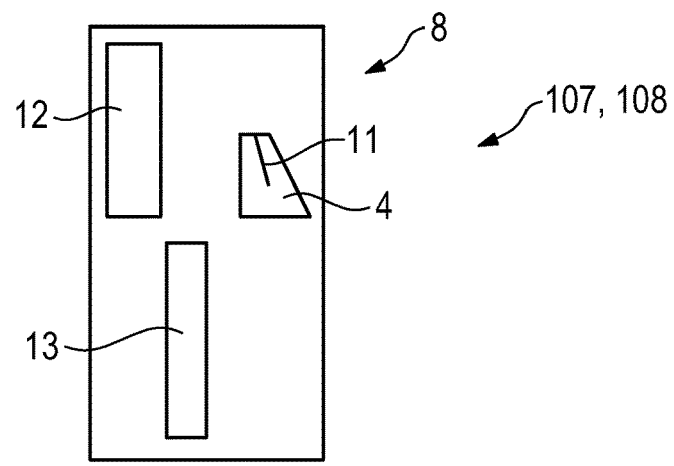
Figure 14:
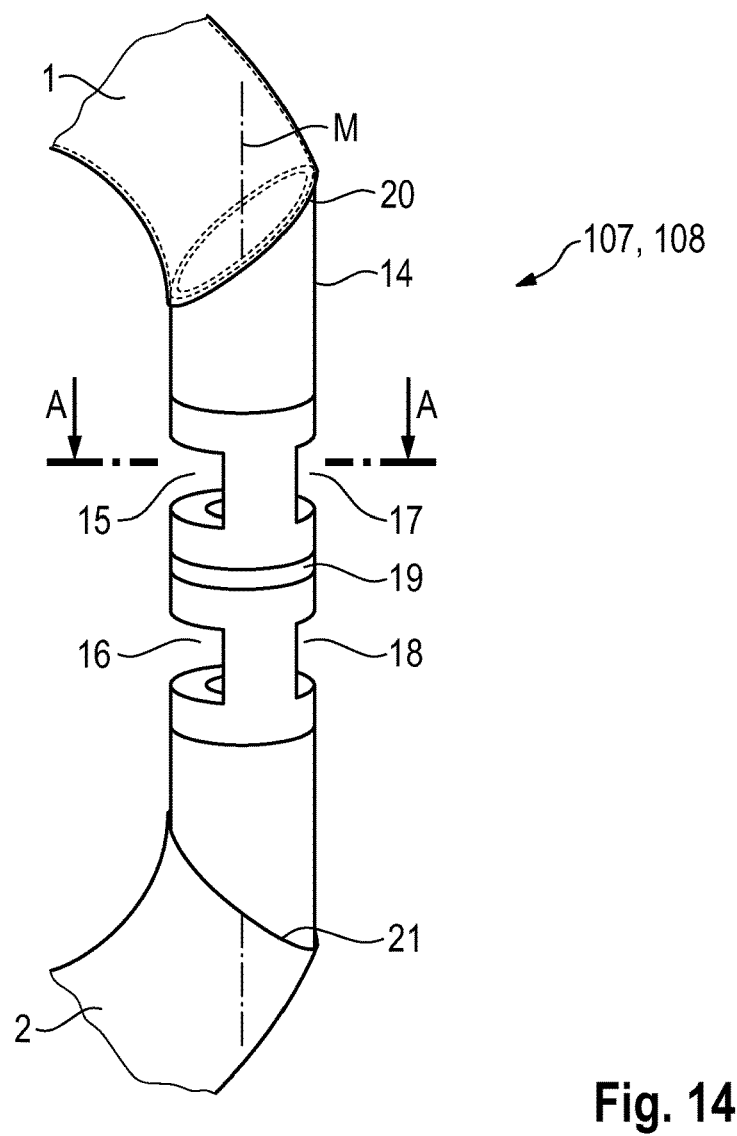
Figure 15:
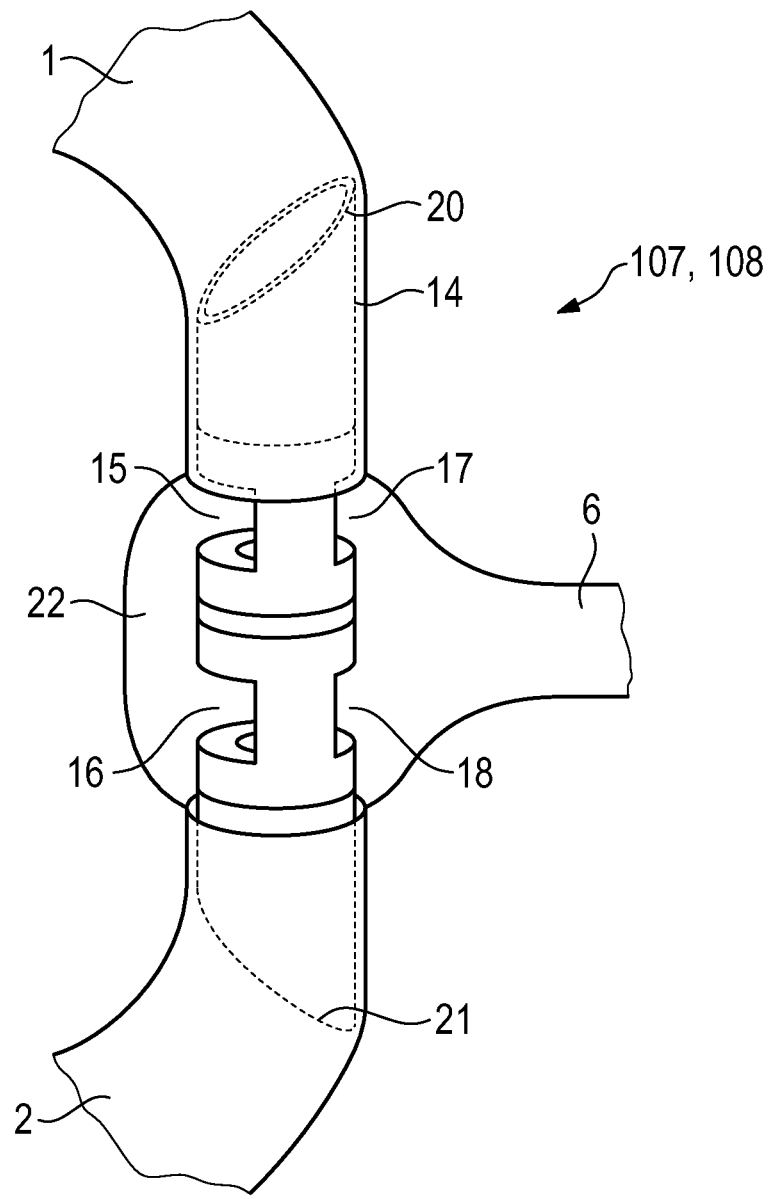
Figure 16:
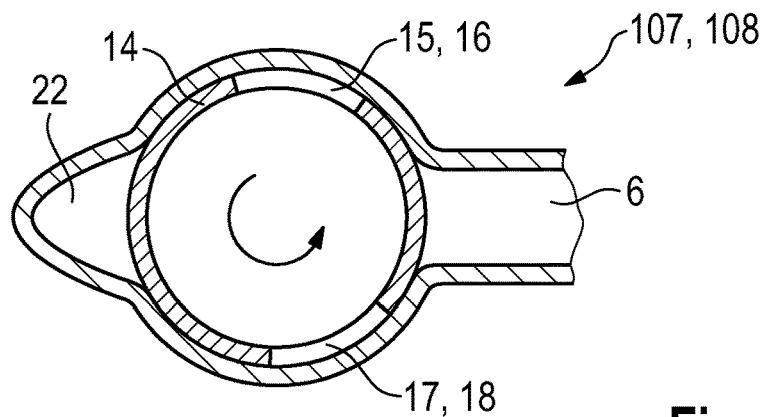
Figure 17:
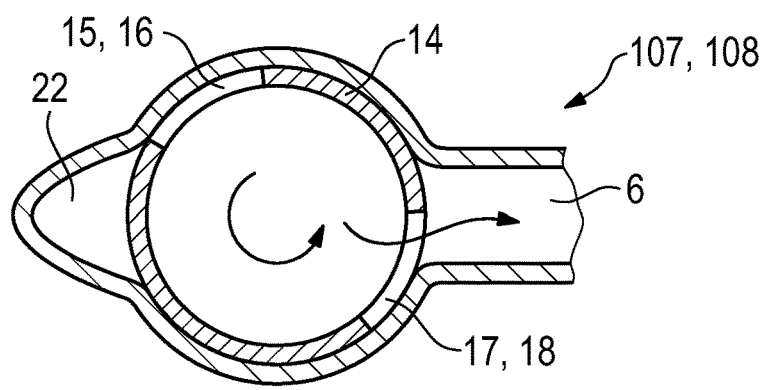
Figure 18:
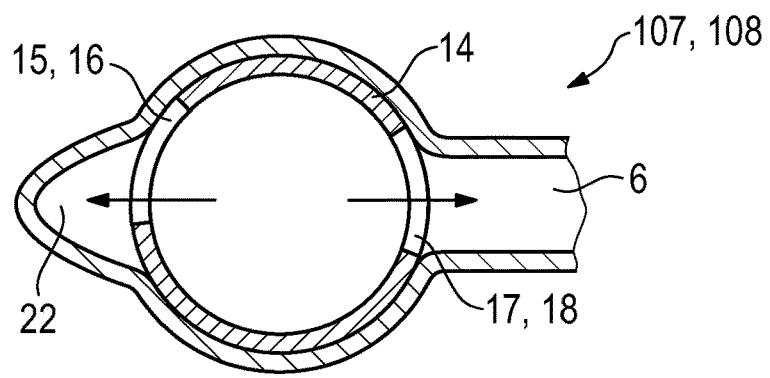
Figure 19:
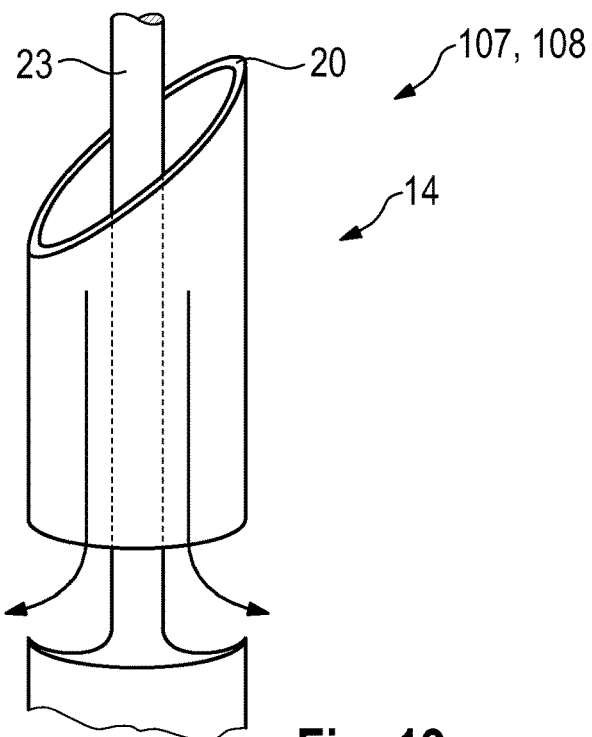
Figure 20:
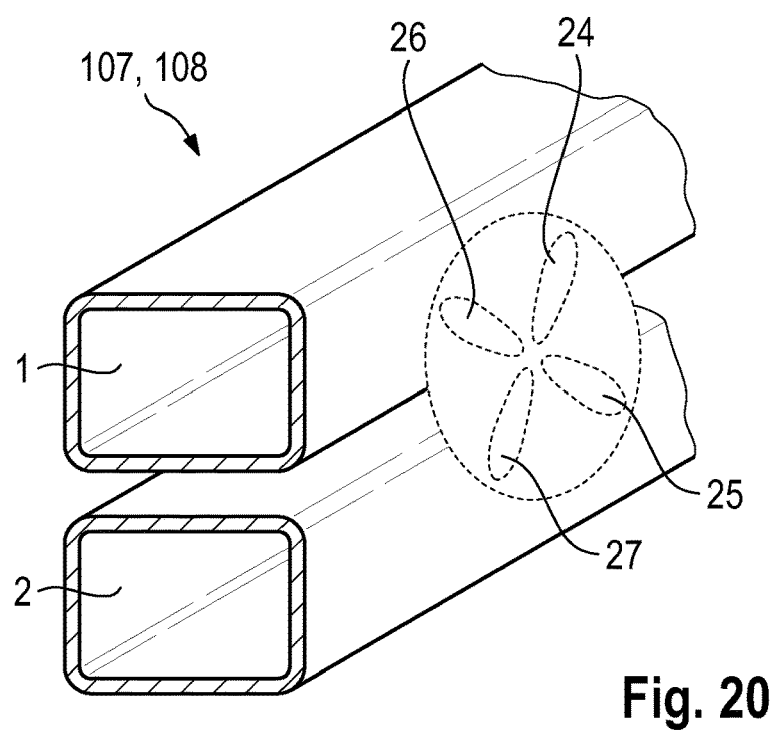
Figure 21:
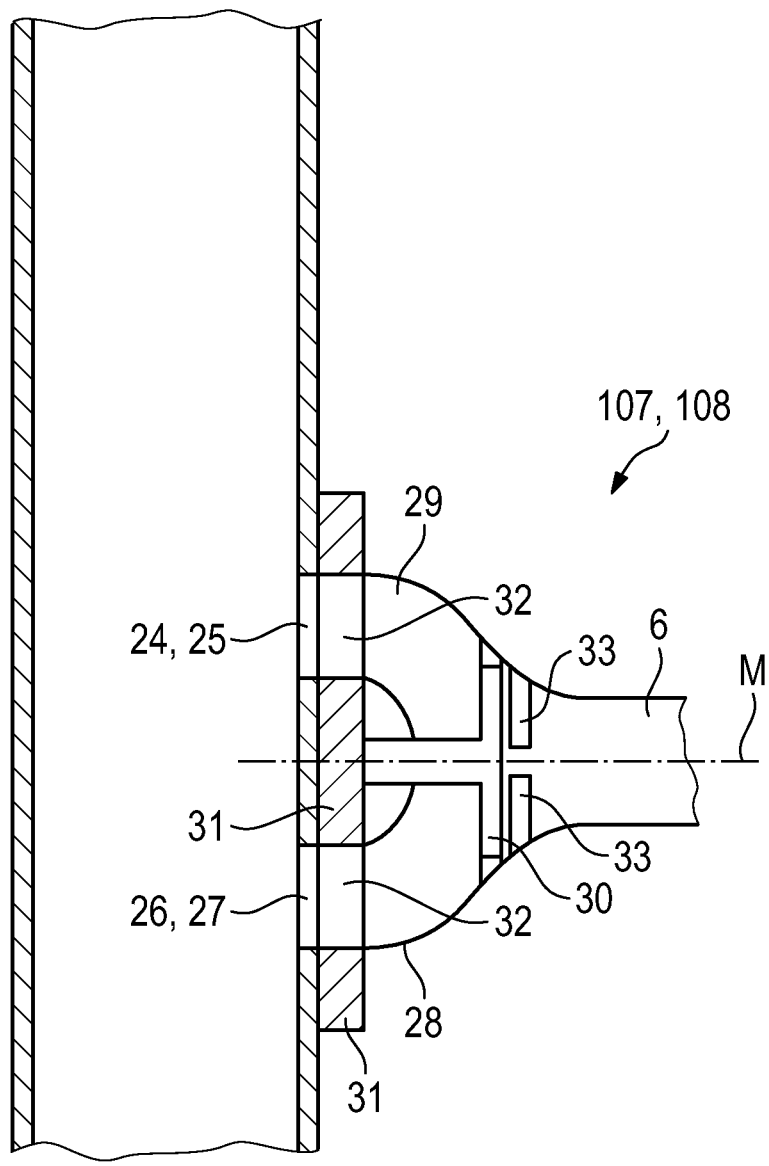
Figure 22:
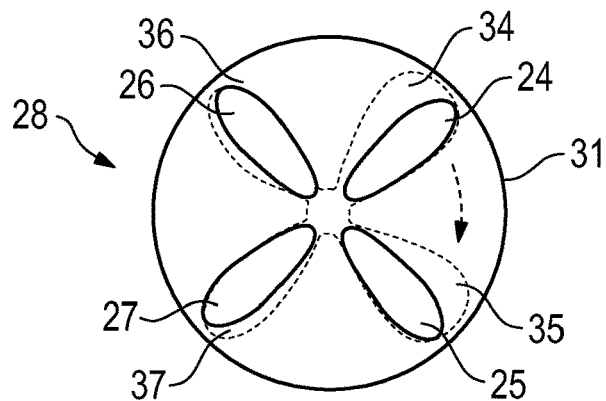
Figure 23:
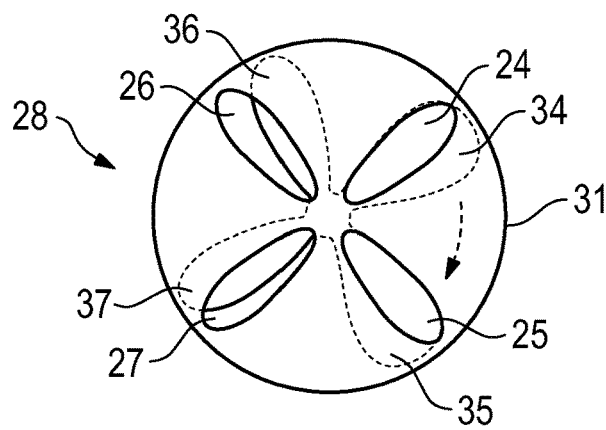
Figure 24:
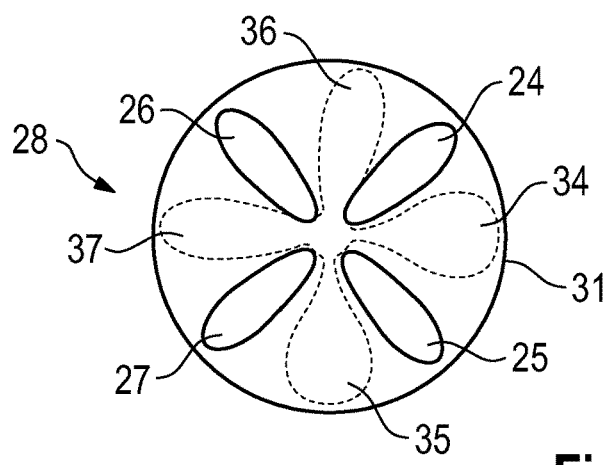
Figure 25:
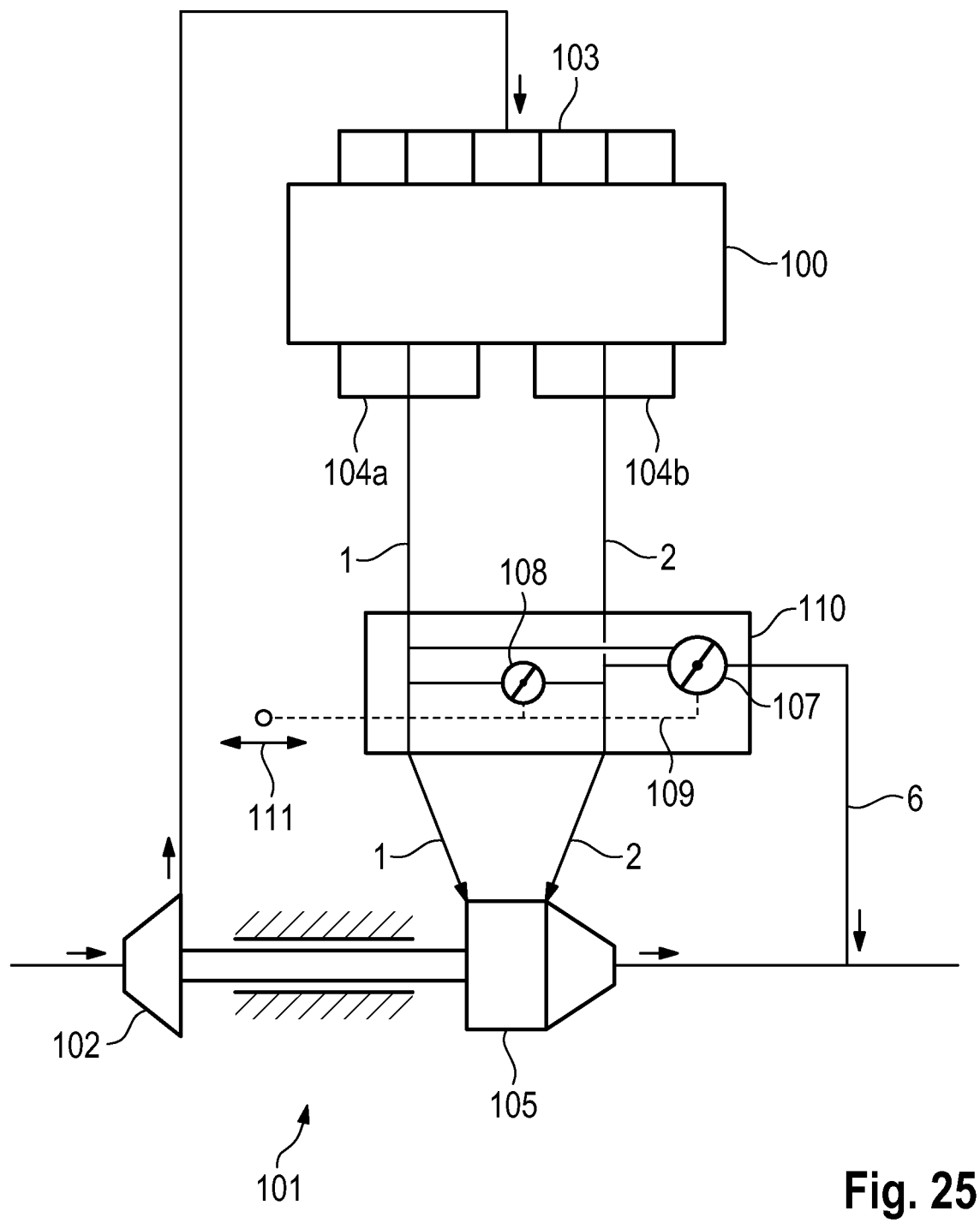
Figure 26:
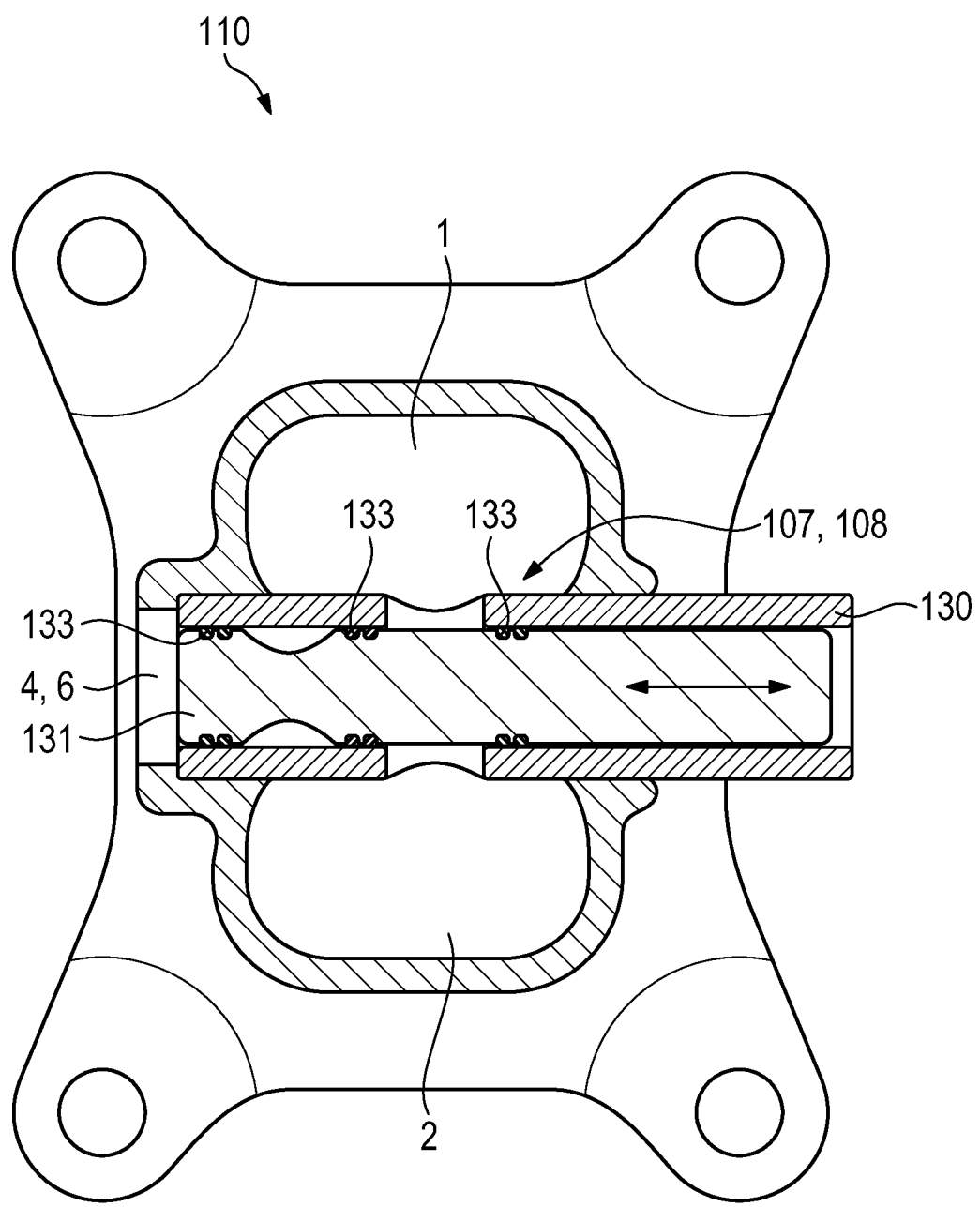
Figure 27:
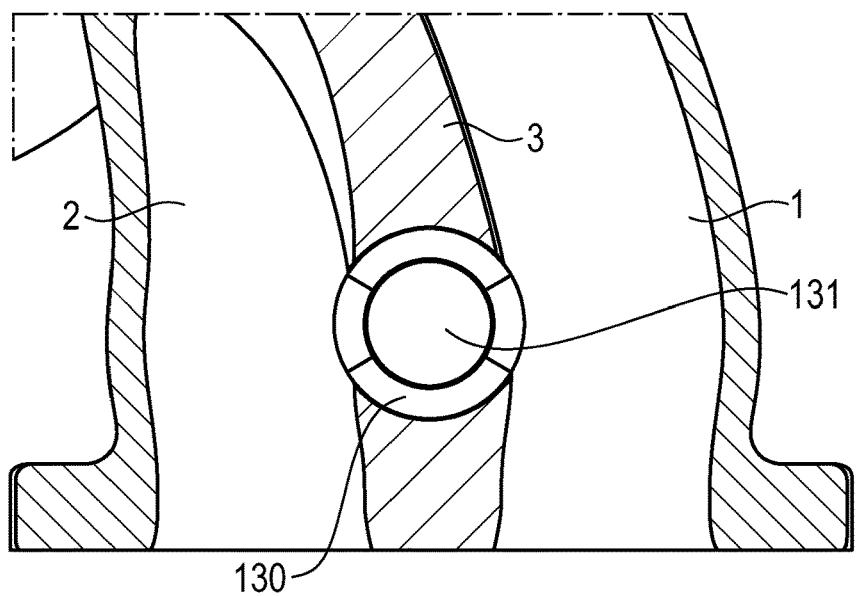
Figure 28:
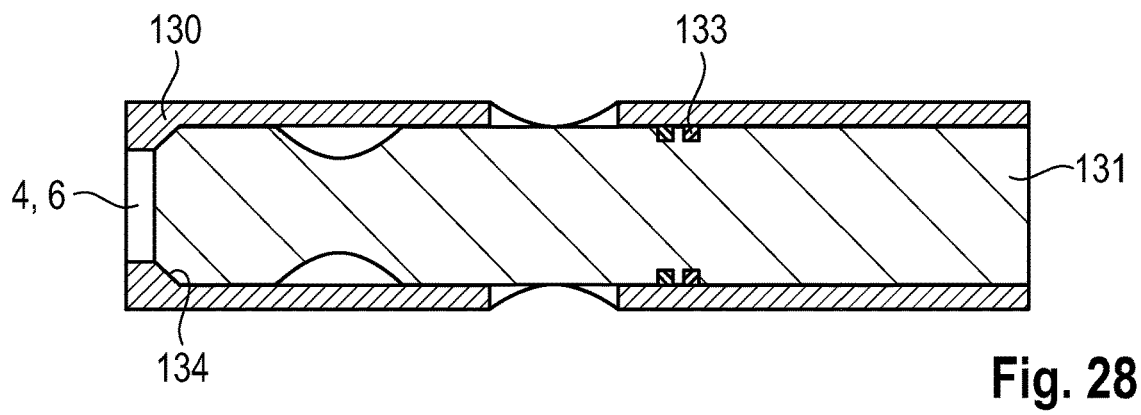
Figure 29:
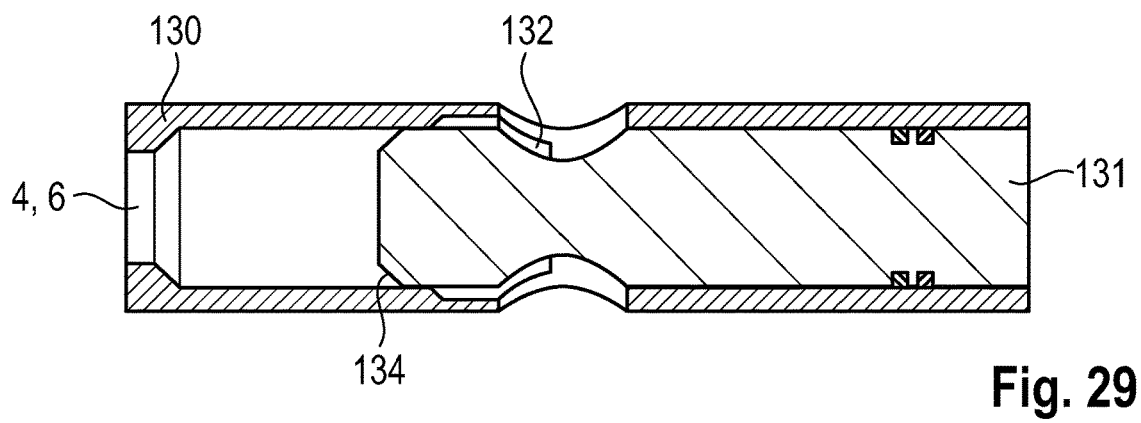
Figure 30:
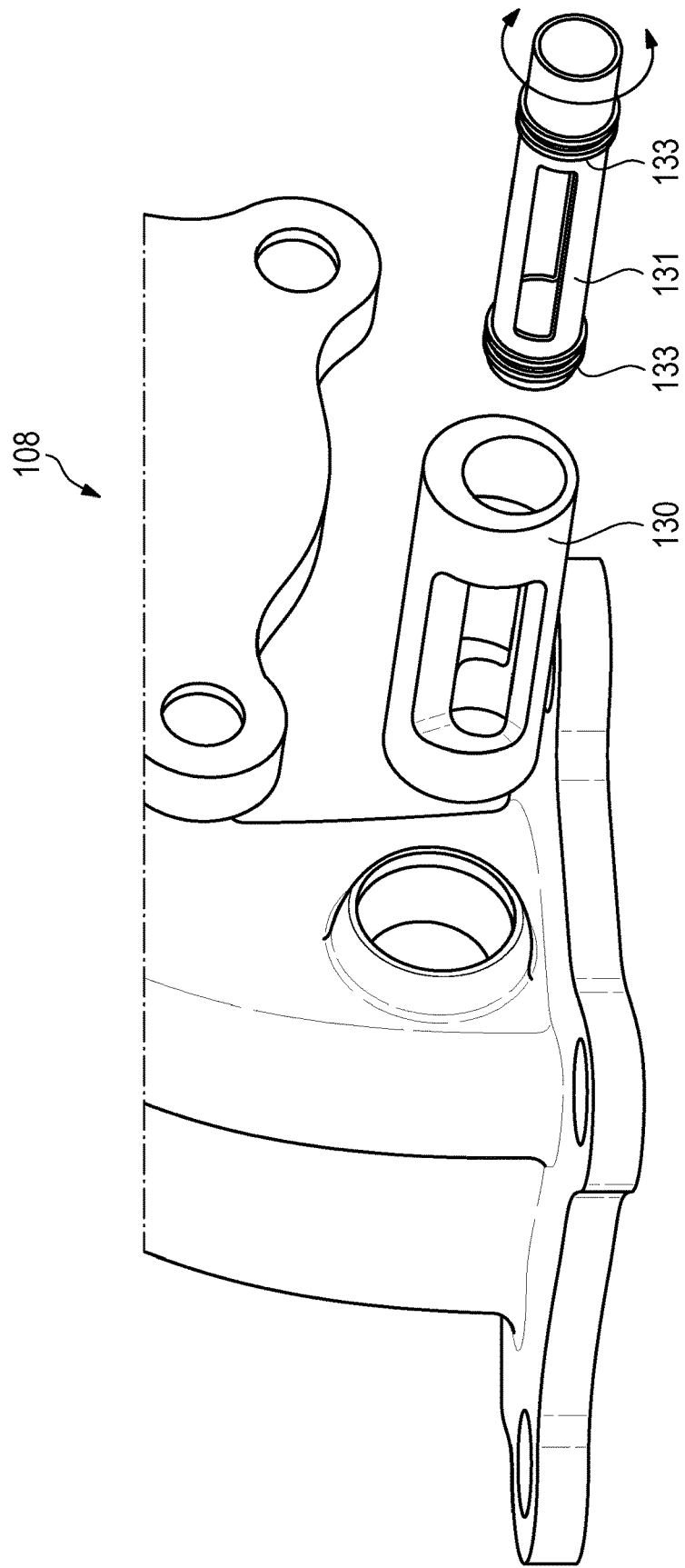
Figure 31:
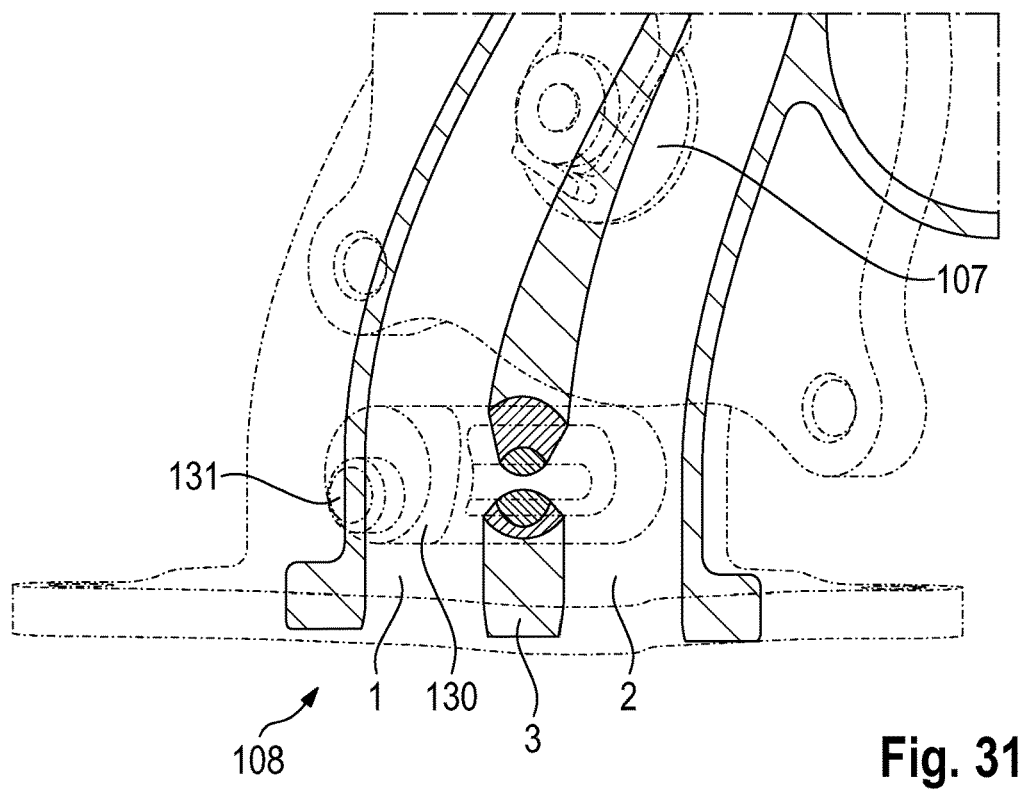
Figure 32:
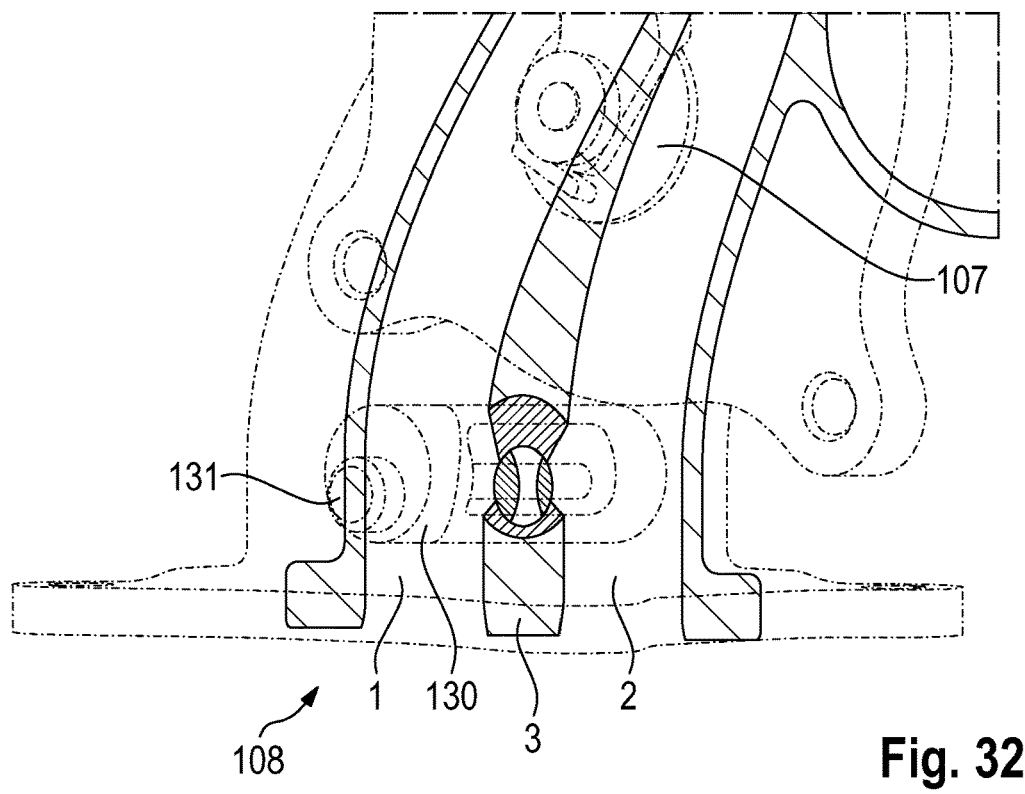
Figure 33:
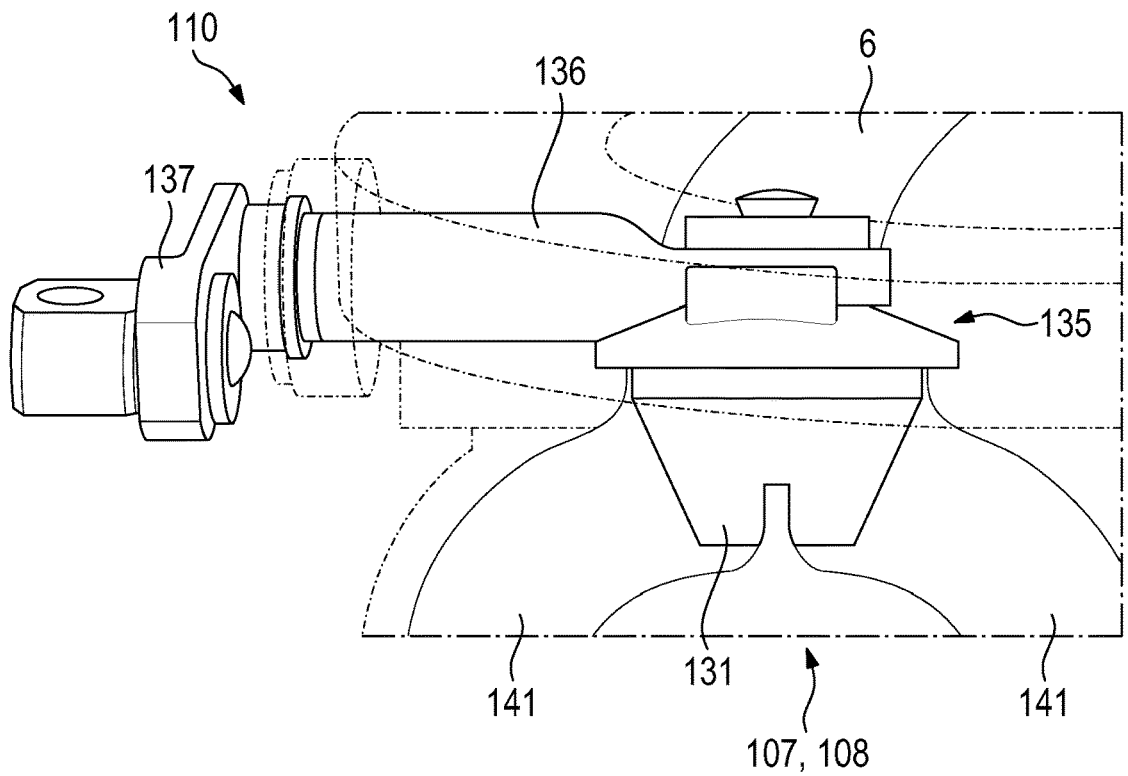
Figure 34:
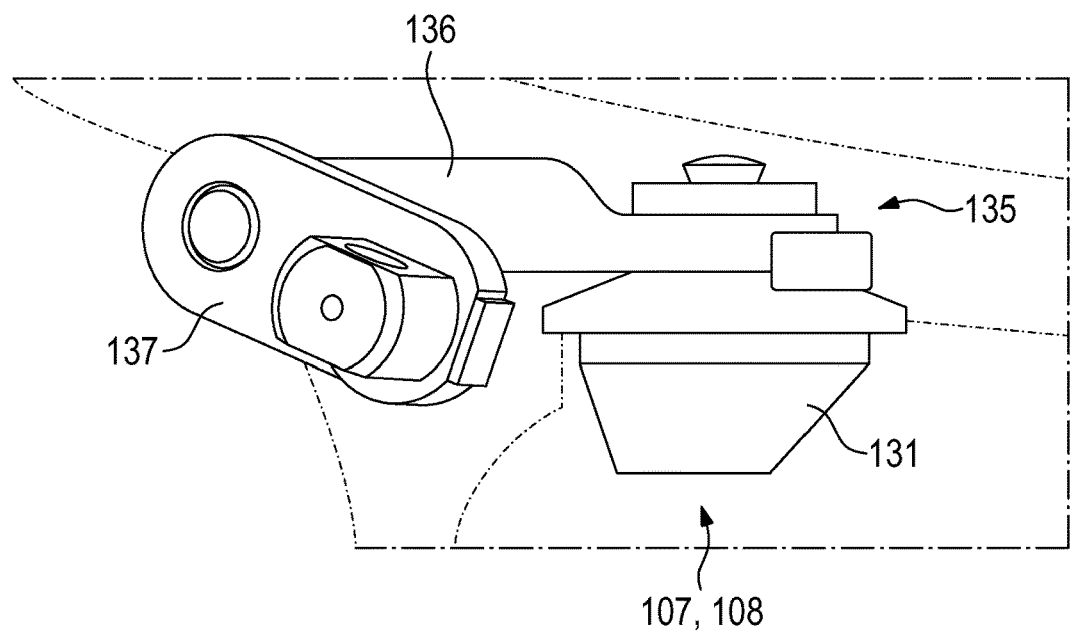
Figure 35:
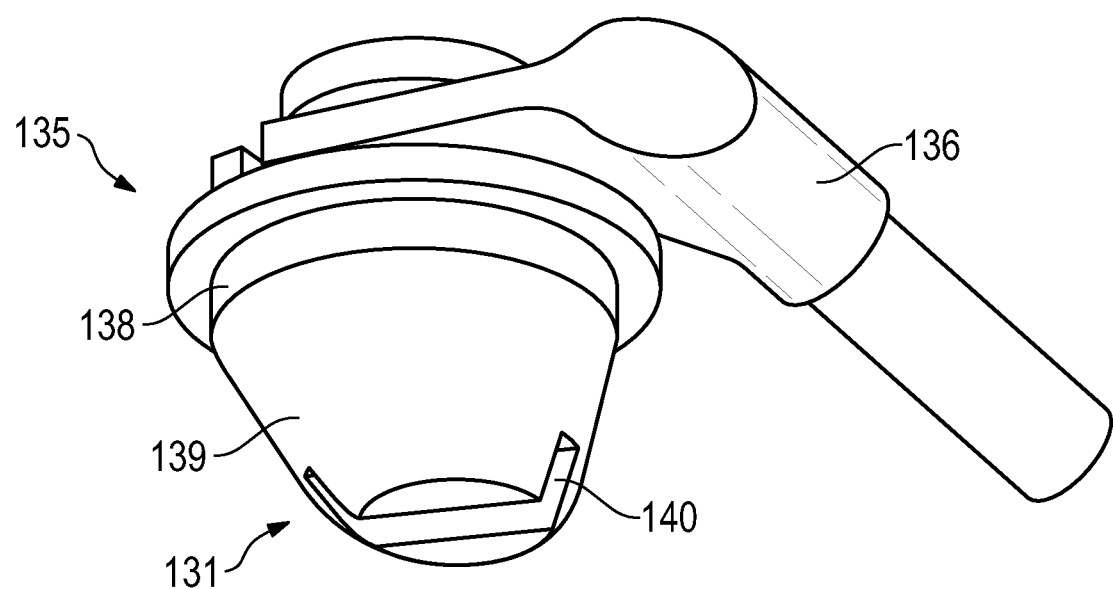
Figure 36:
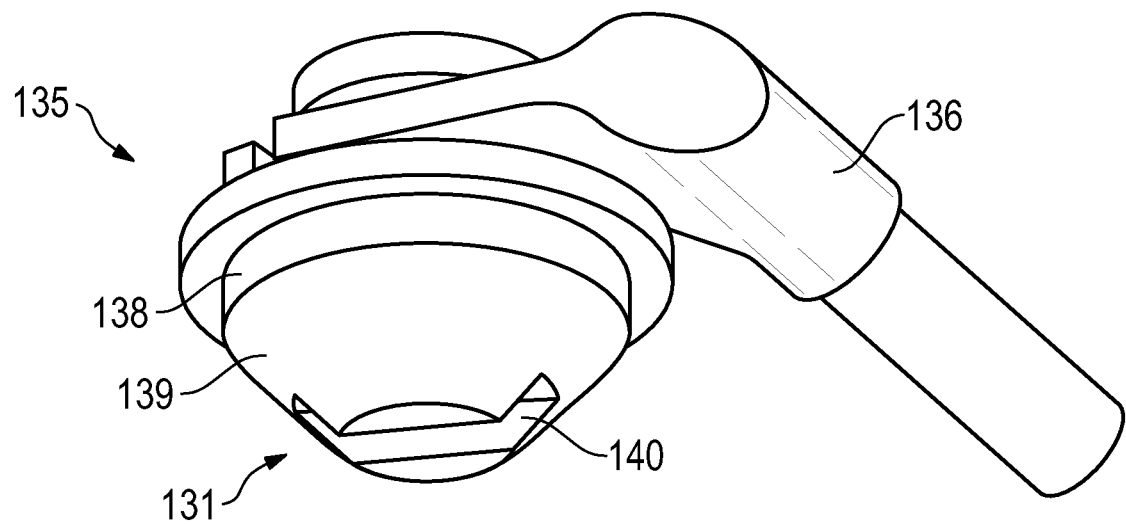
Figure 37:
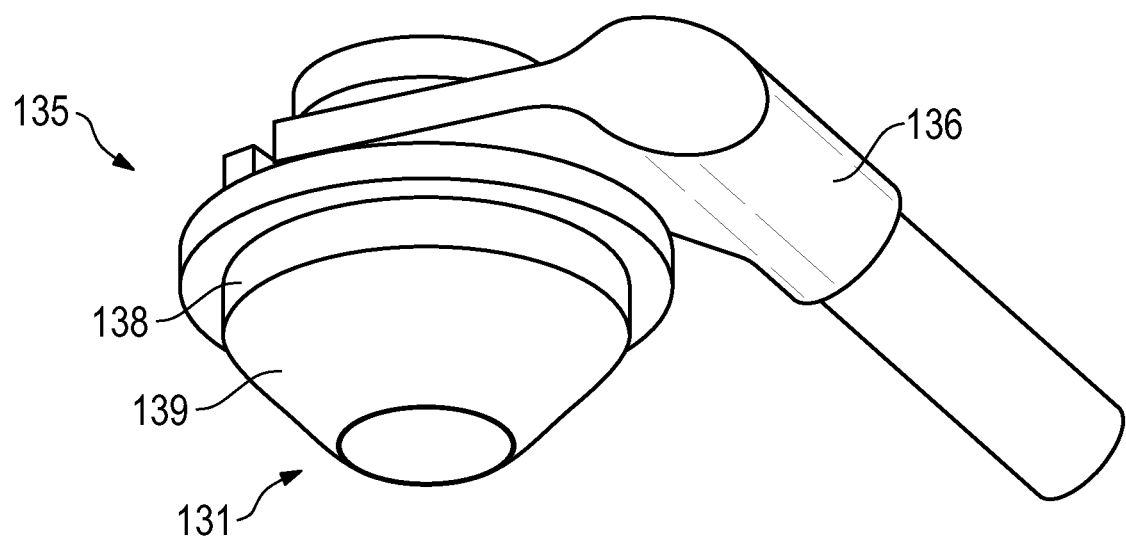

Embodiments of the invention will subsequently be described in more detail by means of the drawings:

FIG. 1 shows a perspective representation of a first embodiment of the invention, FIG. 2 shows a cross section through the first embodiment of the invention in an operating state in which the adjustment element is in a closed position, FIG. 3 shows the cross section from FIG. 2 with the adjustment element in a partially open position, FIG. 4 shows the cross section from FIG. 2 with the adjustment element in a fully open position, FIG. 5 shows an adjustment element of the first embodiment in another variant than that shown in FIGS. 2 to 4, FIG. 5*a* shows an additional variant of the first embodiment with a differently configured guide in a cross section through the flows, FIG. 5*b* shows yet another variant of the first embodiment with yet another differently configured guide in a cross section through the flows, FIG. 5*c* shows an adjustment element for the two variants shown in FIGS. 5*a* and 5*b*, FIG. 5*d* shows another version of an adjustment element for the variants of the first embodiment shown in FIGS. 5*a* and 5*b*, FIGS. 5*e*-5*g* show another version of the adjustment element according to the first embodiment, FIGS. 5*h*-5*k* show another version of the adjustment element according to the first embodiment, FIG. 6 shows a cross section through a second embodiment of the invention, FIG. 7 shows a developed view of the adjustment drum of the second embodiment in a top view, FIG. 8 shows a view of the developed view of the adjustment drum in FIG. 7, FIG. 9 shows a cross section through the adjustment drum in an installed situation in two flows of an exhaust gas turbocharger in the second embodiment in a closed position, FIG. 10 shows the same cross section as in FIG. 9 with the adjustment drum in a position with a slight opening of the bypass valve unit, FIG. 11 shows the cross section from FIG. 10 with the adjustment drum in a position with a more fully opened bypass valve unit and a partially opened flow connection unit, FIG. 12 shows the same cross section as in FIG. 11 with a completely opened bypass valve unit and completely opened flow connection, FIG. 13 shows a developed view of the adjustment drum of the second embodiment in a an additional variant, FIG. 14 shows a schematic representation of an adjustment device comprising a bypass valve unit and a flow connection unit in a third embodiment of an exhaust gas turbocharger, FIG. 15 shows an installed situation for the adjustment device from FIG. 14, FIG. 16 shows a cross section through the installed situation in FIG. 15 including the adjustment device in a closed position, FIG. 17 shows the cross section from FIG. 16, wherein the bypass valve unit of the adjustment device is partially opened, FIG. 18 shows the cross section from FIG. 17, wherein the bypass unit and the flow unit are both completely open, FIG. 19 shows a cutout from the adjustment device in a variant with a shaft, FIG. 20 shows a cutout from an exhaust gas turbocharger with two flow sections in a fourth embodiment of the invention in a perspective view, FIG. 21 shows a cross section through the cutout shown in FIG. 20 including the adjustment device, FIG. 22 shows a schematic top view of the adjustment device from FIG. 21 in a closed position, FIG. 23 shows the adjustment device from FIG. 22 in a position in which the bypass valve unit is partially open, FIG. 24 shows the adjustment device from FIG. 22 in a position in which the bypass valve unit and the flow connection unit are completely open, FIG. 25 shows a schematic representation of the installed situation of the exhaust gas turbocharger according to the invention in a suction- and exhaust gas tract of an internal combustion engine for all embodiments, FIGS. 26, 27 show an adjustment device according to a fifth embodiment, FIG. 28 shows a first variant of the fifth embodiment, FIG. 29 shows a second variant of the fifth embodiment, FIGS. 30-32 show a flow connection unit according to a sixth embodiment of the invention, FIGS. 33-35 show an adjustment device according to a seventh embodiment of the invention, FIG. 36 shows a first variant of the seventh embodiment, FIG. 37 shows a second variant of the seventh embodiment.

EMBODIMENTS OF THE INVENTION

FIG. 1 shows a perspective representation of a cut through two flows 1, 2 of an exhaust gas turbocharger according to the invention. Flows 1, 2 run parallel and are separated from each other by a separating wall 3. Flows 1, 2 have a common bypass through opening 4 which connects the two flows 1 and 2 with their exteriors. In addition, separating wall 3 is removed at the position of bypass through opening 4 so that at this gap a connection of flows 1 and 2 is possible.

FIG. 2 shows a cross section through flows 1, 2, represented in FIG. 1, at a point at which bypass through opening 4 is located. In addition, an adjustment element 5 is represented in FIG. 2. An end of a bypass line 6, which surrounds bypass through opening 4, is additionally represented. Adjustment element 5 closes bypass through opening 4 using a closing section 5a. Using a separation section 5b, it separates flows 1, 2 from each other at the gap at separating wall 3. Adjustment element 5 additionally has a guide section 5c which guides adjustment element 5 on wall 3. In FIG. 2, adjustment element 5 is shown in its closed position in which flows 1, 2 are completely separated from each other and bypass through opening 4 is completely closed.

Adjustment element 5 is thus formed as bypass valve unit 107 and simultaneously as flow connection unit 108.

FIG. 3 shows the cross section from FIG. 2, wherein adjustment element 5 is shown, however, in a position in which bypass through opening 4 is partially opened so that exhaust gas from both flows 1, 2 may enter into bypass line 6. In this position, closing section 5a is lifted away from an outer wall of flows 1, 2, in which outer wall bypass through opening 4 is located. Guide section 5c is displaced with respect to the closed position of the device relative to separating wall 3. In the position shown for adjustment element 5, flows 1, 2 are separated from each other.

FIG. 4 shows the same cross section as FIG. 2 and FIG. 3, however with the difference that adjustment element 5 is shown in a completely extended position. Bypass through opening 4 is completely opened. In addition, guide section 5c is displaced so far with respect to separating wall 3 that a flow connection opening 5d is unblocked. Flow connection opening 5d comprises two individual openings which are each arranged in a leg of guide section 5c. If separating wall 3 is located between the legs of guide section 5c in front of the openings of flow connection opening 5d, then flows 1, 2 are separated from each other. By partially covering the openings of flow connection 5d, the extent of the flow connection may be adjusted. Flow connection opening 5d thus represents a window in guide section 5c.

FIG. 5 shows a variant of adjustment device 5 for the first embodiment of the exhaust gas turbocharger which is shown in FIGS. 1 to 4. Unlike the variants shown in FIGS. 2 to 4, adjustment device 5 in FIG. 5 is designed to be rotatable instead of slidable. Adjustment device 5 has an axis of rotation 7 for this purpose. Axis of rotation 7 is preferably arranged transverse to the longitudinal direction of flows 1, 2. Closing section 5a may likewise close the bypass through opening like the variant shown in FIGS. 2 to 4. A pivoting of adjustment device 5 around axis of rotation 7 effects at least a partial opening of bypass through opening 4 by lifting closing section 5a from the outer side of flows 1, 2 and a flow of exhaust gas flows out of flows 1, 2 into bypass line 6. Separation section 5b, which separates flows 1, 2 in the closed position of adjustment device 5, connects to closing section 5a. Flow connection opening 5d is arranged adjacent to separation section 5b. Separating wall 3 is designed in this variant such that is completely covers flow connection opening 5d in the closed position. At increased opening of the adjustment device, flow connection opening 5d is increasingly unblocked in at least one adjustment range so that an increasing extent of the connection of flows 1, 2 is adjusted. The flow connection does not have to begin thereby directly with the start of the opening of bypass through opening 4, but instead may initially occur at a larger extent of the opening of bypass through opening 4.

FIG. 5a shows in a cross section a variant of the first embodiment with a differently configured guide for adjustment element 5. FIG. 5a conforms in many details with FIGS. 2 to 4. Only the differences will be elaborated on in the following. In addition, the opening of adjustment element 5, designed as bypass valve unit 107 or flow connection unit 108, may occur in a similar way as in FIGS. 2 to 4, wherein differences lie in the type of guiding of adjustment element 5. Specifically, the variant from FIG. 5a has no separating wall 3 between flows 1, 2 at the point of adjustment element 5. The separation of flows 1, 2 is effected by separation section 5b of adjustment element 5. Adjustment element 5 is arranged in a guide recess 38 in the interior of flows 1, 2 and in a transition area between flow 1 and flow 2. Guide recess 38 has a width which is slightly larger than guide section 5c of adjustment element 5. In the closed position of adjustment element 5 shown in FIG. 5a, flow connection opening 5d is arranged in guide recess 38 in adjustment element 5. An opening of adjustment element 5, in that it is moved to the right in the representation according to FIG. 5a, results in that flow connection opening 5d is unblocked and a pressure compensation is effected between first flow 1 and second flow 2. Alternatively to the represented version, the guiding of adjustment element 5 may also be carried out at a guide unit of adjustment element 5, which functions in the opening direction of adjustment element 5 and lies outside of the plane of the drawing and is thus not shown, in particular in conjunction with a separating wall of flows 1, 2 abutting on adjustment element 5 outside of the plane of the drawing. Flow connection opening 5d may thus be omitted, since the adjustment element may be pulled out of the guide recess, wherein it is further guided in the guide unit.

FIG. 5b shows another variant of the first embodiment of the invention in a cross section through flows 1, 2. The variant from FIG. 5b is identical to the variant shown in FIG. 5a except for the guide for adjustment element 5, which is configured differently. Therefore, only the configuration of the guide is elaborated on; for the other features, reference is made to FIG. 5a. Separating wall 3, which has two legs, is arranged between flows 1, 2. Guide recess 38 is arranged between the legs. Adjustment element 5 is designed identically to adjustment element 5 from FIG. 5a. Flow connection opening 5d is uncovered in the same way during the opening of adjustment element 5.

FIG. 5c shows a cross section through the adjustment element 5 which is suited for the variants in FIGS. 5a and 5b. Flow connection opening 5d is configured as a window in an end region of adjustment element 5. The part of guide section 5c, which is located adjacent to flow connection opening 5d, is necessary in order to guide adjustment element 5 in guide recess 38 if flow connection 5d is pulled out of guide recess 38. Flow connection opening 5d may be omitted, as is described with reference to FIG. 5a, if a guide unit is provided on adjustment element 5 which is independent of guide section 5c. Adjustment element 5 of FIG. 5c is provided for a translational opening movement of adjustment element 5.

FIG. 5d shows a cross section of another version of adjustment element 5, which, like the variant in FIG. 5, is configured to be rotatable around axis of rotation 7. Since axis of rotation 7 takes over the guiding of adjustment element 5, guide element 5c may be omitted. In the version shown, adjustment element 5 has flow connection opening 5d available. In a version (not shown), flow connection opening 5d may also be omitted if the engagement of adjustment element 5 in guide recess 38 and the surrounding parts is configured such that a through passage for exhaust gas is unblocked at the edge of separation section 5b during opening of adjustment element 5.

FIGS. 5e to 5g show another embodiment of adjustment element 5 as bypass valve unit 107 and simultaneously as flow connection unit 108.

According to FIG. 5e, a cross-shaped adjustment element 5 is provided that is translationally moveable relative to flows 1, 2 in order to thus regulate the exhaust gas flow between flows 1, 2 and in bypass line 6. FIG. 5e shows an exploded representation. In FIG. 5f, adjustment element 5 is blanked out for the sake of clarity. FIG. 5g shows a partial cutaway of the arrangement.

According to FIGS. 5e to 5g, a common chamber (also: flow connection chamber) is provided into which the two flows 1, 2 open and from which the two flows 1, 2 are guided again. A flow connection thus takes place in the common chamber. Furthermore, the common chamber has two bypass through openings 4. The two separated bypass through openings 4 both lead into common bypass line 6.

Adjustment element 5 has closing section 5a. In the closed state, closing section 5a covers both bypass through openings 4. Due to the corresponding translational movement of adjustment element 5, closing section 5a is lifted so that the two bypass through openings 4 are opened.

Further, adjustment element 5 comprises separation section 5b. Separation section 5b and closing section 5a are connected fixedly to each other and are perpendicular to each other in the design shown here.

Separation section 5b is located in the common chamber between the two flows 1, 2. In the closed state, separation section 5b separates the two flows 1, 2 from each other. For this purpose, separation section 5b is located between the two flows 1, 2 and between the two bypass through openings 4.

By corresponding lifting of adjustment element 5, the exhaust gas flows from the two flows 1, 2 may mix in the common chamber.

In a preferred embodiment, separation section 5b is located on a side of closing section 5a, whereas a continuation 5e of adjustment element 5 is formed on the opposite side of closing section 5a. Continuation 5e forms the continuation of separation section 5b on this opposite side of closing section 5a.

FIG. 5f shows guide recesses 38, designed as grooves. Adjustment element 5 is guided linearly moveably in the two lateral guide recesses 38.

Continuation 5e is inserted in the lower guide recess 38. This effects that, during lifting of adjustment element 5 from the closed position, the two flows 1, 2 initially remain separated from each other by continuation 5e. In this state, an opening is only carried out of the two flows 1, 2 with respect to bypass line 6. Only after an additional linear movement of adjustment element 5 does continuation 5e slide out of lower guide recess 38, by which means a flow connection takes place.

The described common chamber is closed by a cover 5f. Adjustment element 5 preferably protrudes through this cover to the outside so that adjustment element 5 is moveable from outside of cover 5f.

FIGS. 5h to 5k show another embodiment of adjustment element 5 as bypass valve unit 107 and simultaneously as flow connection unit 108. FIG. 5h thereby shows adjustment element 5 and the arrangement thereof in the exhaust gas turbocharger in a schematically simplified representation. FIGS. 5i to 5k show the constructed configuration.

According to FIGS. 5h to 5k, adjustment element 5 is arranged linearly moveable between the two flows 1, 2. The accommodation chamber for adjustment element 5 is closed by a cover 5f. For this purpose, the housing, in which the two flows 1, 2 are also designed, has a housing flange 5h. Cover 5f is fixed on this housing flange 5h, in particular screwed on.

Adjustment element 5 protrudes through cover 5f to the outside so that it is actuatable from outside. Adjustment element 5 is mounted linearly moveable via a bushing 5g within cover 5f.

Bypass line 6 is likewise designed in the housing in which the two flows 1, 2 are also located. FIG. 5k, in particular, shows the arrangement of bypass line 6 in the housing.

FIG. 5j shows adjustment element 5 in detail. Adjustment element 5 comprises separation section 5b. Separation section 5b is located between the two flows 1, 2. Continuation 5e is formed on separation section 5b. This continuation 5e inserts into a corresponding groove in the closed state and during a slight opening of adjustment element 5. The groove delimits the cross section between the two flows 1, 2.

Furthermore, adjustment element 5 comprises closing section 5a. Closing section 5a has a closing surface 5i, formed here as a cylindrical surface. Closing surface 5i completely closes bypass through opening 4 to bypass line 6.

Closing surface 5i of closing section 5a transitions into two projections 5j. The two projections 5j are arranged on opposite sides of adjustment element 5. One projection 5j protrudes respectively into one of the flows 1, 2. Projections 5j may also be characterized as domed surfaces.

As soon as closing surface 5i is moved out of bypass through opening 4, the clearance between bypass through opening 4 and the respective projection 5j determines the opening cross section from the two flows 1, 2 into bypass line 6.

Each projection 5j comprises a convex surface 5l. Closing surface 5i transitions into the two convex surfaces 5l.

The characteristics of adjustment element 5, thus the opening cross section to bypass line 6 and the opening cross section between the two flows 1, 2, are configured by the corresponding configuration of projections 5j and by the configuration of continuation 5e, depending on the position of adjustment element 5.

Within the scope of the first embodiment, it is thus preferably provided that adjustment element 5, in all variants described here, comprises at least one projection 5j with a domed surface. Preferably one projection 5j is formed on adjustment element 5 per flow 1, 2. The distance between the respective projection 5j and bypass through opening 4 defines the cross section from flows 1, 2 into bypass line 6. In an advantageous embodiment, the at least one projection 5j has a convex surface 5l.

FIG. 6 shows a cross section through a second embodiment of an exhaust gas turbocharger according to the invention. As an adjustment device, the exhaust gas turbocharger has an adjustment drum 8, which is designed as bypass valve unit 107 and simultaneously as flow connection unit 108. Adjustment drum 8 is arranged close to an accommodation chamber 9 for the turbine wheel of the exhaust gas turbocharger.

Adjustment drum 8 is arranged in such a way that the exhaust gas flow must at least partially pass through it prior to entering into accommodation chamber 9. Adjustment drum 8 has a supply chamber 8a in which the exhaust gas may enter from the flows and from which exhaust gas may be guided to the turbine wheel. Supply chamber 8a is arranged in the interior of adjustment drum 8. In addition, adjustment drum 8 has a bypass chamber 8b, which is likewise arranged in the interior of adjustment drum 8. Supply chamber 8a and bypass chamber 8b are separated from each other by a drum separating wall 8c.

Entering exhaust gas enters radially into bypass chamber 8b. The entering exhaust gas flow is deflected in bypass chamber 8b such that it exits axially out of the end of adjustment drum 8 on which bypass chamber 8b is arranged. The exiting exhaust gas flow is thereby guided into a bypass line 6. The supply to bypass chamber 8b is carried out from flows 1, 2. The drum separating wall 8c may be formed on the side of bypass chamber 8b such that the shape of the wall favors the deflection of the radially entering exhaust gas flow into an axial direction. In particular, dead spaces are avoided in which exhaust gas vortexes may form. Adjustment drum 8 may be arranged at the transition of the volute of the turbine to the turbine wheel.

FIG. 7 shows a top view on a developed view of a part of adjustment drum 8, which surrounds bypass chamber 8b. The outer wall 10 of adjustment drum 8 is interrupted by bypass through opening 4. By rotating adjustment drum 8, this bypass through opening 4 may be brought at least partially into alignment with a corresponding opening in flows 1, 2 so that exhaust gas may enter bypass chamber 8b from flows 1, 2, which chamber is surrounded by the developed view part of adjustment drum 8 which is depicted. Adjustment drum 8 may be rotated such that bypass through opening 4 is completely closed, partially closed, or completely opened.

In addition, adjustment drum 8 has, on its outer circumference, a drum separation section 11 which may be brought between the two flows 1, 2 in order to separate these to different extents. To adjust the extent of the separation, adjustment drum 8 may be rotated. A rotation of adjustment drum 8 corresponds to a movement of drum separation section 11, for example, in relation to separating wall 3 between flows 1, 2.

FIG. 8 shows in a side view the developed view section of adjustment drum 8 which is shown in FIG. 7. It is quite clear in FIG. 8 that drum separation section 11 protrudes from outer wall 10.

FIG. 9 shows a cross section through a variant of adjustment drum 8, which is again designed as bypass valve unit 107 and flow connection unit 108. Adjustment drum 8 comprises drum separating wall 8c, which diverts exhaust gas, which penetrates the interior of adjustment drum 8, in a flow-favorable way in the direction of bypass line 6. Adjustment drum 8 supports a drum separation section 11, which separates flows 1, 2 from each other in the closed position shown in FIG. 9. Bypass valve unit 107 is not explicitly shown; however, this contacts bypass through opening 4 (see FIG. 10) in adjustment drum 8, which may be brought into alignment with openings in flows 1, 2 so that exhaust gas may flow through the bypass though opening to an adjustable extent. This exhaust gas may arrive in bypass chamber 8b and may be guided to bypass line 6. Exhaust gas, which does not enter into adjustment drum 8, is guided to the turbine wheel by channels which are not shown. In the closed position shown in FIG. 9, however, no exhaust gas flows through adjustment drum 8.

FIG. 10 shows the representation from FIG. 9 with the difference that bypass valve unit 107 is opened in the position of adjustment drum 8 shown, so that exhaust gas may arrive in bypass channel 6 through bypass through opening 4. Drum separation section 11 stands, as in FIG. 9, with the section 11a connected to material between flows 1, 2, so that a flow separation is provided.

FIG. 11 shows adjustment drum 8 in a position in which bypass valve unit 107 is opened, as in FIG. 10, and additionally a flow connection occurs. A through passage between flows 1, 2 is unblocked between the material which separates flows 1, 2 from each other and the upper edge 11b of drum separation section 11, which is effective in this state. Upper edge 11b runs obliquely to the tangential direction of adjustment drum 8, so that a rotation of adjustment drum 8 causes the height of drum separation section 11 to appear with different heights at flow connection opening 5d and thus to close the same to an adjustable extent. Adjustment drum 8 is thereby rotated around the center axis M thereof.

FIG. 12 shows the cross section from FIG. 11; however, adjustment drum 8 has been further rotated. Flow connection opening 5d functions at maximum flow connection. Simultaneously, a part of bypass through opening 4, which is not covered by drum separation section 11, allows exhaust gas to flow into bypass line 6. This situation is clear from FIG. 7, in which it is shown that drum separation section 11 extends, starting from the right, across only approximately half of the length of flow connection opening 5d in the horizontal direction of FIG. 7. The part of bypass through opening 4 shown to the left thereof in FIG. 7 is not covered by drum separation section 11 and thus allows, when it is adjusted, that drum separation section 11 completely unblocks flow connection opening 5d. In addition, it enables a maximum through opening cross section for exhaust gas into bypass line 6. This setting is depicted in FIG. 12.

FIG. 13 shows the developed view of a variant of adjustment drum 8. Three through openings for exhaust gas are located on the outer circumference of adjustment drum 8, namely bypass through opening 4 which has drum separation section 11 as shown in FIGS. 7 to 12, and a nozzle opening 12 or 13 for the first or the second flow 1, 2 respectively. During rolling up of the developed view shown into adjustment drum 8, this is wrapped around an axis which runs in FIG. 13 in the horizontal direction. The passages through flows 1, 2 or to the turbine wheel belonging to nozzle openings 12 and 13 are arranged such that a rotation of adjustment drum 8 causes a change in the size of the nozzles. In this way, the A/R ratio of the turbocharger may be changed. The radius of the turbine wheel remains constant thereby; however the supply cross section of exhaust gas is changed. By this means, the characteristics of the turbocharger may be changed. An adjustment of this type may be carried out by the mechanical coupling of flow connection unit 108 with bypass valve unit 107 simultaneously for both units, wherein the adjustment of the flow connection is effected by drum separation section 11 and the adjustment to bypass valve unit 107 by means of bypass through opening 4.

FIG. 14 shows an adjustment drum 14 as an adjustment element of a third embodiment of the exhaust gas turbocharger. Adjustment drum 14 has a tube as the base shape. Exhaust gas is guided into adjustment drum 14 from flows 1, 2 at one end each of adjustment drum 14. The exhaust gas is guided in the interior of adjustment drum 14 to a flow connection opening 15 or 16 respectively. After the exhaust gas has flowed through flow connection openings 15 or 16, a pressure compensation may be carried out between the exhaust gas from the two flows 1, 2. Afterwards, the exhaust gas is supplied to the turbine wheel.

In addition, adjustment drum 14 has a bypass through opening 17 or 18 for each of the two flows 1, 2. Adjustment drum 14 is designed preferably symmetrical around a center in the longitudinal direction of adjustment drum 14. An intermediate wall 19, which separates flows 1, 2 from each other within adjustment drum 14, is arranged between the two ends and between flow connection openings 15, 16 which are assigned to one flow 1, 2 respectively. The two ends of adjustment drum 14 are preferably designed as chamfered surfaces of a plane arranged oblique to a longitudinal axis M of adjustment drum 14 and which comprises a tube shaped end section of adjustment drum 14. This results in the end edges 20 and 21. End edges 20 and 21 are respectively arranged on one end of one of flows 1 or 2, wherein flows 1, 2 run in a curved way at their outlet to this end. In this way, a rotation of adjustment drum 14 results in that the protruding part of end edge 20 or 21 protrudes in a different way into the end of flow 1 or 2. Due to the different projection of end edge 20 or 21, the flow resistance is changed at the entry into adjustment drum 14. In this way, it is possible to throttle the exhaust gas flow during entry into adjustment drum 14 and to influence the output of the turbine in this way.

FIG. 15 schematically shows the same embodiment of the exhaust gas turbocharger as in FIG. 14, wherein a bypass channel 6 and a flow connection channel 22 are represented in addition to adjustment drum 14. In an integrated view with FIG. 14, it is clear that exhaust gas, which exits from flow connection openings 15 and 16 of adjustment drum 14, enters into flow connection channel 22 in which a pressure compensation between the exhaust gas flows occurs. Exhaust gas from adjustment drum 14 may also arrive at the turbine wheel via a channel that is not shown.

In conjunction with openings of a separating wall, which is adjacent to bypass through openings 17 and 18, the extent of the passage of exhaust gas into bypass line 6 may be effected by rotating exhaust gas drum 14. In the same way, the extent of the flow connection, in conjunction with openings of a separating wall which openings are adjacent to flow connection openings 15 and 16 of adjustment drum 14, may be adjusted by rotating adjustment drum 14.

FIG. 16 shows a cross section through adjustment drum 14, flow connection channel 22, and bypass channel 6, wherein adjustment drum 14 is located in a closed position in which no exhaust gas flows into flow connection channel 22 or into bypass line 6.

FIG. 17 shows the cross section from FIG. 16, wherein adjustment drum 14 is shown, however, in a position in which bypass through opening 17 or 18 of adjustment drum 14 is partially opened so that exhaust gas may into bypass channel 6 from adjustment drum 14. Flow connection channel 22 is separated from the interior of adjustment drum 14.

FIG. 18 shows the same cross section as FIG. 17, wherein, however, adjustment drum 14 is brought into a position in which flow connection openings 15 or 16 are rotated such that exhaust gas may enter into flow connection channel 22. Flows 1, 2 are thus connected to each other and congestion charging takes place. At the same time, bypass valve unit 107, which is adjustable via the positions of bypass through openings 17 or 18, is completely open.

FIG. 19 shows in a perspective view an end of adjustment drum 14 with end edge 20 by way of example. In the variant shown, adjustment drum 14 has a shaft 23. Shaft 23 may be fixed to intermediate wall 19 of adjustment drum 14. A shaft 23 is preferably arranged at both ends of adjustment drum 14. In this way, adjustment drum 14 may be mounted on both ends in bearings for the respective shafts 23.

FIG. 20 shows a perspective representation of the two flows 1, 2 of the exhaust gas turbocharger in a fourth embodiment of the invention. Each of the two flows 1, 2 has an exhaust gas outlet opening 24 or 25 and an exhaust gas inlet opening 26 or 27. These are penetrations through an outer wall respectively of one of flows 1, 2. Openings 24, 25, 26, 27 are preferably configured and arranged in the form of a four-leafed clover. Exhaust gas inlet openings 26 and 27 lie downstream in the flow direction of the exhaust gas with respect to exhaust gas outlet openings 24, 25.

FIG. 21 shows a cutaway through one of flows 1, 2 shown in FIG. 20. In addition, an adjustment element 28 is represented. Adjustment element 28 is formed as bypass valve unit 107 and simultaneously as flow connection unit 108. Adjustment element 28 covers all four openings 24, 25, 26, and 27. There is a cover disk 31 on the end of adjustment element 28 facing flows 1, 2, which cover disk has slots 32 which may be placed to a greater or lesser extent in front of openings 24 through 27 by rotating cover disk 31. By this means, flows 1, 2 are connected to different extents.

Cover disk 31 is connected to a bypass valve disk 30 in such a way that both may be rotated jointly. Bypass valve disk 30 has a slot (not shown) which, in conjunction with a fixed closing element 33, introduces a greater or smaller flow resistance for exhaust gas in the direction of bypass channel 6, and thus functions as bypass valve unit 107. Thus, through joint rotation of cover disk 31 and bypass valve disk 30, the extent of the flow connection and the extent of the opening of the bypass valve may be adjusted from bypass valve disk 30 and associated closing element 33. Since adjustment element 28, including the mountings thereof, covers both flows 1, 2, the exhaust gas of both flows 1, 2 mixes in an overflow chamber 29 of adjustment element 28.

FIG. 22 schematically shows a top view on the side of flows 1, 2 which have openings 24 through 27. Adjustment element 28 is depicted symbolically as a circle. Cover disk 31 has approximately the same shape as a four-leaf clover and is arranged in the interior of adjustment element 28. The leaf shaped lobes 34, 35, 36, 37 of cover disk 31 may respectively cover one of openings 24, 25, 26, or 27. In this way, adjustment element 28 is shown in FIG. 22 in a closed position in which no exhaust gas may exit from flows 1, 2 into adjustment element 28.

Cover disk 31 is rotatably mounted around the center M thereof. Cover disk 31 may be rotated to adjust the extent of the flow connection and the extent of the entry of exhaust gas into adjustment element 28. At the same time, and which is not shown, bypass valve disk 30, which is shown in FIG. 21, is rotated with cover disk 31. By means of an appropriate coordination of the time and the extent of the unblocking of a bypass through opening by bypass valve disk 30, the behavior of the discharge of exhaust gas into bypass line 6 may be adjusted with respect to the flow connection, which is adjustable by means of cover disk 31.

Alternatively to the version shown, a version with slots in cover disk 31 is also conceivable, in which the slots are arranged such that they unblock openings 24 through 27 in the sense of an adjustment feature in a suitable sequence and at a suitable extent, and in particular close, or partially or completely unblock them.

FIG. 23 schematically shows the same top view as FIG. 22, with the difference, however, that exhaust gas inlet openings 26 and 27 are partially uncovered, while exhaust gas outlet openings 24 and 25 are still covered by cover disk 31. In this way, exhaust gas may enter into the interior of adjustment element 28, pass through a bypass through opening, and leave adjustment element 28 through bypass line 6. Bypass valve unit 107 is at least partially opened for this purpose. A flow connection does not occur in the setting of adjustment element 28 shown in FIG. 23.

FIG. 24 shows the same top view as FIGS. 22 and 23; however, cover disk 31 is brought into a position in which exhaust gas inlet openings 26, and 27 and also exhaust gas outlet openings 24 and 25 are unblocked. In this way, a flow connection occurs, wherein a part of the exhaust gas which exits from exhaust gas outlet openings 24 and 25 is guided via bypass valve unit 107 and through bypass line 6.

In order to achieve the functionality of adjustment element 28 clarified by FIGS. 22 through 24, leaf-shaped lobes 34 and 35 of cover disk 31 are designed as wider in the circumferential direction than lobes 36 and 37. In this way, lobes 34 and 35 may cover outlet openings 24 and 25 across a larger rotational area of cover disk 31 and thus enable, as is shown in FIG. 23, that an entry of exhaust gas into adjustment element 28 is exclusively adjustable, without an exit of exhaust gas through exhaust gas outlet openings 26 and 27. Bypass valve unit 107 may therefore by opened without the occurrence of a flow connection.

FIG. 25 shows a schematic representation of a piston-driven internal combustion engine 100, which is designed in this example as a six-cylinder engine, with an exhaust gas turbocharger 101 according to the invention. Exhaust gas turbocharger 101 has a compressor 102 which compresses fresh gas and supplies a suction tract 103 of internal combustion engine 100. Two manifolds 104a and 104b are arranged on the exhaust gas side of internal combustion engine 100 and each receives exhaust gas from three cylinders respectively. The exhaust gas from each of manifolds 104a and 104b is supplied into one of flows 1 or 2 respectively. Flows 1 and 2 supply the exhaust gas to a turbine 105 of exhaust gas turbocharger 101.

A part of this exhaust gas may be removed from flows 1, 2 and bypassed past turbine 105 via bypass line 6. The extent of the removal of exhaust gas may be adjusted via bypass valve unit 107. In addition, flows 1, 2 may be connected to each other by flow connection unit 108. Flow connection unit 108 may be adjusted in order to determine the extent to which flows 1, 2 are connected to each other.

Adjustment devices of flow connection unit 108 and bypass valve unit 107 are mechanically coupled to each other by a coupling unit 109 which is depicted by a dashed line. In this way, flow connection unit 108 and bypass valve unit 107 may be jointly adjusted, for which purpose only a single control signal or a single control movement 111 is necessary. Flow connection unit 108 and bypass valve unit 107 are schematically integrated in an adjustment device 110.

Adjustment device 110, shown schematically here, represents adjustment element 5, adjustment drum 8, adjustment drum 14, or adjustment element 28 of the embodiments described. In the embodiments, with the exception of FIG. 30, adjustment device 110 functions simultaneously as coupling unit 109, since bypass valve unit 107 and flow connection unit 108 are simultaneously actuated by the movement of adjustment device 110.

In the embodiment according to FIG. 30, only flow connection unit 108 is actuated by rotation of valve body 131. Bypass valve unit 107 is realized by a conventional waste gate valve (not shown). Coupling unit 109 connects valve body 131 with the waste gate valve in a mechanical way so that both elements, namely valve body 131 and the waste gate valve are simultaneously moved by a movement of coupling unit 109.

In the following, different embodiments of the invention will be explained in more detail by means of detailed examples by way of FIGS. 26 through 37.

FIGS. 26 through 29 show a fifth embodiment. FIG. 26 shows the two flows 1, 2 and adjustment device 110 between the two flows 1, 2 in a cutaway. This adjustment device 110 here unifies the functions of bypass valve unit 107 and flow connection unit 108. FIG. 27 shows how adjustment device 110 is arranged in separating wall 3 between the two flows 1, 2 as close as possible to the entry to the turbine housing.

Adjustment device 110 comprises here a sleeve 130. Sleeve 130 is arranged fixed in separating wall 3. Openings to the respective flows 1, 2 are located in the lateral surface of sleeve 130. In addition, sleeve 130 is open on the face sides thereof. An axially moveable valve body 131 is inserted into sleeve 130, designed as a piston. Valve body 131 is correspondingly moveable in the axial direction, indicated by arrows in FIG. 26.

The open front face of sleeve 130 on the left opens into bypass through opening 4 or into bypass line 6 (not shown here).

Three pairs at piston rings 133 (seals) enable at least three different switch settings: The openings to flows 1, 2 and bypass through opening 4 are closed in the position shown in FIG. 26. If valve body 131 is moved to the right, the taper in valve body 131 overlaps the two openings to flows 1, 2. If valve body 131 is moved further to the right, the openings to flows 1, 2 are connected to bypass through opening 4.

FIG. 28 additionally shows a first variant in which a sealing chamfer 134 to sleeve 130 is designed on the left end of valve body 131. The corresponding piston ring 133 may be omitted due to this sealing chamber 134.

FIG. 29 shows a second variant. In the second variant, the sealing chamfer 134 is also provided. In addition, sleeve 130 has a recess 132 in the area of the openings to flows 1, 2. Depending on the configuration of this recess 132, the through flow amount from flows 1, 2 to bypass through opening 4 may be regulated. Recess 132 may be configured on the inner circumference of sleeve 130 and/or on the outer circumference of valve body 131.

According to the fifth embodiment, the invention also preferably provides that a fixed sleeve 130 is arranged in separating wall 3 between the two flows 1, 2. A corresponding valve body 131 is guided axially moveably in this sleeve 130 so that, according to the position of valve body 131, the two flows 1, 2 are connected to each other and/or to bypass through opening 4.

FIGS. 30 to 32 show a sixth embodiment. Flow connection unit 108 is shown in particular in this case. The associated bypass valve unit 107 is carried out in this embodiment by a conventional waste gate valve (FIGS. 31, 32).

FIG. 30 shows the structure of flow connection unit 108 in an exploded view. FIGS. 31 and 32 show purely schematically two different switch positions, wherein it may be seen that flow connection unit 108 is arranged between the two flows 1, 2 in separating wall 3. Flow connection unit 108 is open in FIG. 31. Flow connection unit 108 is closed in FIG. 32.

As may be seen best in FIG. 30, flow connection unit 108 comprises again a sleeve 130 arranged fixedly in separating wall 3. In this embodiment as well, sleeve 130 has openings in the lateral surface to the two flows 1, 2. A valve body 131 is inserted into sleeve 130. In contrast to the fifth embodiment, valve body 131 in the sixth embodiment is not axially moveable, but instead may be rotated, as this is indicated by the arrows in FIG. 30.

Valve body 131 has a penetration. Piston rings 133 are located on both sides of the penetration for sealing. According to the rotational position of valve body 131 in sleeve 130, the penetration of valve body 131 overlaps with the openings of sleeve 130. By this means, the exchange between the two flows 1, 2 may be regulated.

Corresponding to the sixth embodiment, a sleeve 130 is preferably provided arranged in separating wall 3, wherein a rotatable valve body 131 is arranged in sleeve 130 and regulates the volume exchange between the two flows 1, 2.

FIGS. 33 to 37 show a seventh embodiment. In the seventh embodiment, a waste gate valve 135 is modified in such a way that it fulfills the functions of bypass valve unit 107 and flow connection unit 108. Waste gate valve 135 represents here the adjustment device 110 described in FIG. 25.

FIGS. 33 and 34 show waste gate valve 135 in two different views. This waste gate valve 135 is connected, as per usual, to a lever 137 via a shaft 136. Via lever 137, a corresponding actuator pivots shaft 136 so that waste gate valve 135 may be opened or closed. According to FIG. 33, two bypass channels 141 are joined at waste gate valve 135. Each of bypass channels 141 is constantly connected to a flow 1, 2.

Waste gate valve 135 comprises valve body 131, in addition to the flap plate thereof which connects to bypass line 6. This valve body 131 is fixedly connected to the flap plate and thus opens with waste gate valve 135. In the closed state, waste gate valve 135 closes the two bypass channels 141 with respect to bypass line 6. At the same time, valve body 131 separates the two bypass channels 141 from each other so that no exchange is also possible between the two flows 1, 2.

FIG. 35 shows the exact design of waste gate valve 135. It is thereby clearly visible that valve body 131 has a cylindrical lateral surface 138 on the side facing the flap plate. This cylindrical lateral surface 138 transitions into a conical lateral surface 139. A groove 140 is preferably provided on the truncated cone of valve body 131. In the closed state, a bar engages in this grove 140 between the two bypass channels 141, as FIG. 33 shows by way of example.

In particular, the design of the height of cylindrical lateral surface 138 enables a corresponding regulation of the through flow amount into bypass line 6. If, for example, cylindrical lateral surface 138 is designed relatively high, then waste gate valve 135 may be opened correspondingly wide, wherein the opening to bypass line 6 remains closed as long as possible and, due to conical lateral surface 139, an exchange is possible between the two flows 1, 2.

Valve body 131 in FIG. 35 is designed asymmetrically (not rotationally symmetrical). Thus, the side of conical lateral surface 139 facing shaft 136 is steeper than the diametrically opposite side. This asymmetry is preferably used as waste gate valve 135 is pivoted via the eccentrically located shaft 136.

However, the variants in FIGS. 36 and 37 also show that valve body 131 may be symmetrically designed. The producibility is thereby simplified.

The variant in FIG. 37 shows that a groove 140 does not need to be mandatorily designed on the truncated cone of valve body 131.

The seventh embodiment also preferably provides that adjustment device 110 according to the invention comprises a waste gate valve 135 with valve body 131, wherein valve body 131 comprises a cylindrical lateral surface 138 and/or a conical lateral surface 139 in order to thus function as bypass valve unit 107 and simultaneously as flow connection unit 108.

LIST OF REFERENCES

1 Flow
2 Flow

3 Separating wall
4 Bypass through opening
5 Adjustment element of the first embodiment; generally designated as adjustment device
5a Closing section
5b Separation section
5c Guide section
5d Flow connection opening
5e Continuation
5f Cover
5g Bushing
5h Housing flange
5i Closing surface
5j Projection
5j Convex surface
6 Bypass line
7 Axis of rotation
8 Adjustment drum as adjustment element of the second embodiment; generally designated as adjustment device
8a Supply chamber
8b Bypass chamber
8c Drum separating wall
9 Accommodation chamber for a turbine wheel
10 Outer wall of the adjustment drum 8
11 Drum separation section
11a Section
11b Upper edge
12 Nozzle opening
13 Nozzle opening
14 Adjustment drum as adjustment element for the third embodiment; generally designated as adjustment device
15 Flow connection opening
16 Flow connection opening
17 Bypass through opening
18 Bypass through opening
19 Intermediate wall
20 End edge
21 End edge
22 Flow connection channel
23 Shaft
24 Exhaust gas outlet opening
25 Exhaust gas outlet opening
26 Exhaust gas inlet opening
27 Exhaust gas inlet opening
28 Adjustment element of the fourth embodiment; generally designated as adjustment device
29 Overflow chamber
30 Bypass valve disk
31 Cover disk
32 Slots
33 Closing element
34 Lobe
35 Lobe
36 Lobe
37 Lobe
38 Guide recess
100 Internal combustion engine
101 Exhaust gas turbocharger
102 Compressor
103 Suction tract
104a Manifold
104b Manifold
105 Turbine
107 Bypass valve unit
108 Flow connection unit
109 Mechanical coupling unit
110 Adjustment device
111 Control movement
130 Sleeve
131 Valve body
132 Recess
133 Piston ring
134 Sealing chamfer
135 Waste gate flap; generally designated as adjustment device
136 Shaft
137 Lever
138 Cylindrical lateral surface
139 Conical lateral surface
140 Groove
141 Bypass channel
M Central axis

The invention claimed is:

1. A multi-flow exhaust gas turbocharger (101) including a turbine comprising
a turbine housing surrounding a turbine wheel, the turbine housing including a separating wall (3) to separate a first exhaust flow (1) and a second exhaust flow (2),
a bypass line (6) for bypassing exhaust flow from both the first exhaust flow (1) and a second exhaust flow (2) past the turbine wheel,
a bypass valve unit (107) for adjusting bypass exhaust gas flow through the bypass line (6), the bypass valve unit (107) comprising
a bypass valve opening in the turbine housing and a bypass valve for selectively blocking said bypass valve opening,
and
a flow connection unit (108) for switching between pulse charging operation and congestion charging operation, comprising an opening through the separating wall (3) for bi-directional exhaust flow from the first exhaust flow (1) to the second exhaust flow (2) and from the second exhaust flow (2) to the first exhaust flow (1) and a valve for selectively blocking said opening through the separating wall,
wherein the bypass valve of the bypass valve unit (107) and the valve of the flow connection unit (108) are mechanically coupled.

2. The multi-flow exhaust gas turbocharger (101) according to claim 1, wherein the bypass valve of the bypass valve unit (107) and the valve of the flow connection unit (108) are combined to form an adjustment device (5, 8, 14, 28, 110, 135).

3. The multi-flow exhaust gas turbocharger (101) according to claim 2, wherein, by means of the adjustment device (5, 8, 14, 28, 110, 135) in a closed position, one or more bypass through openings (4) for exhaust gas from the first and second exhaust flows (1, 2) is closed at least partially, and by a movement of the adjustment device (5, 8, 14, 28, 110, 135) relative to the first and second exhaust flows, a bypass throughflow cross section is adjusted in at least one bypass through opening (4), by a straight line, translational relative movement, and/or by a rotational relative movement, namely around an axis of rotation (7, M) which runs through the adjustment device (5, 8, 14, 28, 110, 135).

4. The multi-flow exhaust gas turbocharger (101) according to claim 2, wherein the adjustment device is an adjustment drum (8, 14),
wherein the adjustment drum (8, 14) has at least one bypass through opening (4, 17, 18) for guiding exhaust gas into the bypass line (6), wherein the bypass through opening (4, 17, 18) is adjustable in its bypass throughflow cross section, by rotation and/or by displacing the adjustment drum (8, 14) relative to the first and second exhaust flows (1, 2).

5. The multi-flow exhaust gas turbocharger (101) according to claim 4, wherein the adjustment drum (8, 14) is arranged at a transition of the first and second exhaust flows (1, 2) to the turbine wheel and has a nozzle opening (12, 13) or a flow opening (15, 16) for each of the first and second exhaust flows (1, 2), wherein an exhaust gas flow-through cross section of each nozzle opening (12, 13) or each flow opening (15, 16) is adjustable by rotating the adjustment drum (8, 14).

6. The multi-flow exhaust gas turbocharger (101) according to claim 2, wherein to homogenize mixed exhaust gas from both first and second exhaust flows (1, 2), the flow connection unit (108) has a distance from the turbine (105) which is at least five times an average diameter of one of the first and second exhaust flows (1, 2) at the adjustment device of the bypass valve unit (107) and the valve of the flow connection unit (108).

7. The multi-flow exhaust gas turbocharger (101) according to claim 2, wherein the turbine has a variable turbine geometry with an adjustment ring and adjustable blades,
wherein actuation of the adjustable blades simultaneously affects an actuation of the bypass valve unit (107) and the flow connection unit (108),
wherein the adjustment device (110) is an adjustment drum (8, 14) integrated into the adjustment ring which surrounds the turbine wheel (9).

8. The multi-flow exhaust gas turbocharger (101) according to claim 2, wherein the adjustment device (5, 8) has a separation section (5b) or a drum separation section (11), by means of which a flow resistance between the first and second exhaust flows (1, 2) which is affected by the size of one or more openings or by the extent of the protrusion of the separation section (5b) or drum separation section (11), is changed by a movement of the adjustment device (5, 8) relative to the first and second exhaust flows (1, 2), wherein the separation section (5b) or the drum separation section (11) has a guide unit for guiding the adjustment element (5, 8) along the relative movement, and/or is fixed on a guide unit.

9. The multi-flow exhaust gas turbocharger (101) according to claim 2, wherein, upon actuating the adjustment device of the bypass valve unit (107) and the valve of the flow connection unit (108), beginning from a fully closed position and proceeding to a fully open position of the bypass valve unit (107) and the flow connection unit (108), the bypass valve unit (107) begins to open the bypass valve opening before the flow connection unit (108) begins to open the opening through the separating wall.

10. A controller for the multi-flow exhaust gas turbocharger (101) according to claim 2, wherein the adjustment device (5, 8, 14, 28, 110, 135) is actuated at increasing engine speed and/or engine load.

11. A method for controlling the multi-flow exhaust gas turbocharger (101) according to claim 2, wherein the adjustment device (5, 8, 14, 28, 110, 135) is actuated at increasing engine speed and/or engine load.

12. The method for controlling the multi-flow exhaust gas turbocharger (101) according to claim 11, wherein, upon actuating the adjustment device of the bypass valve unit (107) and the valve of the flow connection unit (108), beginning from a fully closed position and proceeding to a fully open position of the bypass valve unit (107) and the flow connection unit (108), the bypass valve unit (107) begins to open the bypass valve opening before the flow connection unit (108) begins to open the opening through the separating wall.

* * * * *